US012812673B2

(12) United States Patent
Peng

(10) Patent No.: US 12,812,673 B2
(45) Date of Patent: Nov. 24, 2026

(54) SIDELINK COMMUNICATION METHOD AND DEVICE TO DETECT CONSISTENT LISTEN BEFORE TALK (LBT) FAILURES

(71) Applicant: HUAWEI TECHNOLOGIES CO., LTD., Shenzhen (CN)

(72) Inventor: Wenjie Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 247 days.

(21) Appl. No.: 18/591,036

(22) Filed: Feb. 29, 2024

(65) Prior Publication Data

US 2024/0205967 A1 Jun. 20, 2024

Related U.S. Application Data

(63) Continuation of application No. PCT/CN2022/114176, filed on Aug. 23, 2022.

(30) Foreign Application Priority Data

Aug. 31, 2021 (CN) .......................... 202111011966.1

(51) Int. Cl.
*H04W 74/0808* (2024.01)
*H04L 12/413* (2006.01)

(52) U.S. Cl.
CPC ....... *H04W 74/0808* (2013.01); *H04L 12/413* (2013.01)

(58) Field of Classification Search
CPC . H04W 74/00; H04W 74/08; H04W 74/0805; H04W 74/0808
See application file for complete search history.

(56) References Cited

U.S. PATENT DOCUMENTS

2020/0221495 A1* 7/2020 Chen .................... H04W 74/002
2020/0267763 A1* 8/2020 Deogun ............ H04W 74/0825
(Continued)

FOREIGN PATENT DOCUMENTS

CN 109792778 A 5/2019
CN 111867116 A 10/2020
(Continued)

OTHER PUBLICATIONS

Japanese Office Action issued in corresponding Japanese Application No. 2024-513467, dated Feb. 25, 2025, pp. 1-9.
(Continued)

*Primary Examiner* — Warner Wong

(74) *Attorney, Agent, or Firm* — HAUPTMAN HAM, LLP

(57) ABSTRACT

A sidelink communication method and device. A first communication device receives configuration information from a network device. The configuration information is usable by the first communication device to detect consistent listen before talk LBT failures that occur in a first resource pool. The configuration information is associated with a first carrier or the first resource pool, and the first resource pool belongs to the first carrier. In addition, the first communication device sends first indication information to the network device. The first indication information indicates the first resource pool in which the consistent LBT failures
(Continued)

occur. Validity of a transmission resource of a sidelink resource pool or carrier is ensured, and network communication reliability is improved.

20 Claims, 5 Drawing Sheets

(56) References Cited

U.S. PATENT DOCUMENTS

| | | | | |
|---|---|---|---|---|
| 2020/0351669 | A1 | 11/2020 | Xu et al. | |
| 2021/0100031 | A1 | 4/2021 | Cirik et al. | |
| 2021/0144762 | A1 * | 5/2021 | Tsai | H04L 5/0098 |
| 2021/0195637 | A1 | 6/2021 | Xue et al. | |
| 2021/0195649 | A1 * | 6/2021 | Xue | H04W 72/20 |
| 2021/0410113 | A1 * | 12/2021 | Xue | H04W 72/20 |
| 2022/0022252 | A1 * | 1/2022 | Lee | H04W 24/08 |
| 2022/0312378 | A1 * | 9/2022 | Xue | H04L 1/1819 |
| 2023/0015997 | A1 * | 1/2023 | Liu | H04W 74/0816 |
| 2023/0209599 | A1 * | 6/2023 | Du | H04W 74/0808 370/329 |

FOREIGN PATENT DOCUMENTS

| | | | |
|---|---|---|---|
| EP | 4044745 | A1 | 8/2022 |
| JP | 2022550371 | A | 12/2022 |
| WO | 2020198584 | A1 | 10/2020 |
| WO | 2021081700 | A1 | 5/2021 |
| WO | 2022104545 | A1 | 5/2022 |

OTHER PUBLICATIONS

International Search Report issued in corresponding International Application No. PCT/CN2022/114176, dated Oct. 9, 2022, pp. 1-10.

Extended European Search Report issued in corresponding European Application No. 22863227.9, dated Nov. 12, 2024, pp. 1-9.

Huawei, HiSilicon, Discussion on remaining MAC open issues for 5G V2X with NR SL, 3GPP TSG-RAN WG2 Meeting #110 electronicR2-2005492, Jun. 1-12, 2020, total 44 pages.

Korean Office Action issued in corresponding Korean Application No. 10-2024-7010436 dated Apr. 16, 2026.

Intel Corporation, Uu-based Sidelink Resource Allocation for V2X Use Cases, 3GPP TSG RAN WG1 Meeting #96 R1-1902486, Athens, Greece, Feb 25.-Mar. 1, 2019, total 10 pages.

Extended European Search Report issued in corresponding European Application No. 26156132.8, dated Jul. 24, 2026, pp. 1-9.

* cited by examiner

| | | | | | | | |
|---|---|---|---|---|---|---|---|
| $RP_7$ | $RP_6$ | $RP_5$ | $RP_4$ | $RP_3$ | $RP_2$ | $RP_1$ | $RP_0$ |

| | | | | | | | |
|---|---|---|---|---|---|---|---|
| $C_7$ | $C_6$ | $C_5$ | $C_4$ | $C_3$ | $C_2$ | $C_1$ | $C_0$ |
| $RP_7$ | $RP_6$ | $RP_5$ | $RP_4$ | $RP_3$ | $RP_2$ | $RP_1$ | $RP_0$ |

...

| | | | | | | | |
|---|---|---|---|---|---|---|---|
| $RP_7$ | $RP_6$ | $RP_5$ | $RP_4$ | $RP_3$ | $RP_2$ | $RP_1$ | $RP_0$ |

SIDELINK COMMUNICATION METHOD AND DEVICE TO DETECT CONSISTENT LISTEN BEFORE TALK (LBT) FAILURES

CROSS-REFERENCE TO RELATED APPLICATIONS

This application is a continuation of International Application No. PCT/CN2022/114176, filed on Aug. 23, 2022, which claims priority to Chinese Patent Application No. 202111011966.1, filed on Aug. 31, 2021. The disclosures of the aforementioned applications are hereby incorporated by reference in their entireties.

BACKGROUND

With development of wireless communication technologies, a future-oriented communication system is developed, for example, a 5th generation mobile communication (5G) system or a new radio (NR) system. In the foregoing communication systems, direct communication is performed between terminals through a sidelink. A typical application scenario of sidelink communication is vehicle-to-everything (V2X). In the vehicle-to-everything, each vehicle is understood as a terminal. The terminals communicate with each other through a sidelink, for example, perform information transmission in a direct connection manner. This effectively reduces a communication delay.

Wireless communication is performed based on spectrum resources, and the spectrum resources are classified into two types: a licensed spectrum (an unshared spectrum) and an unlicensed spectrum (a shared spectrum). As mobile data service volumes continuously increase, the spectrum resources become increasingly strained. Service transmission performed by using only the licensed spectrum resource cannot meet a service volume goal. Therefore, service transmission performed on the unlicensed spectrum is considered in a long term evolution (LTE) system, the new radio (NR) system, and the like. The unlicensed spectrum is a spectrum that is shared by many different air interface technologies, for example, a wireless local area network that meets the Institute of Electrical and Electronics Engineers (IEEE) 802.11 protocol and LTE licensed spectrum assisted access (LAA).

Because the unlicensed spectrum is a shared spectrum resource, to ensure that different communication devices in different air interface technologies coexist on the unlicensed spectrum, a mechanism is used to avoid mutual interference between the different communication devices. The mechanism is listen before talk (LBT), and is also referred to as a channel access process. in response to performing communication on the unlicensed spectrum, the communication devices perform channel contention in the unlicensed spectrum through the channel access process. in response to channel access succeeding, the service transmission is performed by using the unlicensed spectrum. in response to the channel access failing, the service transmission cannot be performed.

However, in the foregoing solution, only a wireless communication process between the terminal and a base station is considered during LBT configuration, and a sidelink communication process between the terminals is not considered. Therefore, a technology is desired to introduce an LBT design based on a sidelink communication usage.

SUMMARY

Embodiments described herein provide a sidelink communication method and device, to implement information transmission between terminals.

According to a first aspect, a sidelink communication method is provided. The method includes: A first communication device receives configuration information from a network device. The configuration information is used by the first communication device to detect consistent listen before talk LBT failures that occur in a first resource pool, the configuration information is associated with a first carrier or the first resource pool, and the first resource pool belongs to the first carrier. In addition, the first communication device sends first indication information to the network device. The first indication information indicates the first resource pool in which the consistent LBT failures occur.

That the configuration information is associated with the first carrier or the first resource pool is understood as that the configuration is based on a carrier granularity or a bandwidth part (BWP) granularity, or is based on a resource pool granularity. The carrier granularity is understood as that LBT detection is independently configured by using a carrier as a granularity. The BWP granularity is understood as that the LBT detection is independently configured by using a BWP as a granularity. The resource pool granularity is understood as that the LBT detection is independently configured by using a resource pool as a granularity. Optionally, one carrier includes one or more BWPs, and one BWP includes one or more resource pools. In response to one carrier including one BWP, the BWP granularity is being the carrier granularity.

The first communication device, for example, a first terminal, obtains a resource pool configuration in different manners. In a first manner, the network device, for example, a base station, configures the resource pool for the first terminal through dedicated signaling or system broadcast. In a second manner, the first terminal obtains the resource pool based on a preconfiguration.

Based on the communication manner, flexible configuration of sidelink communication between terminals is implemented, and system adaptation reliability is improved.

A manner of obtaining a sidelink resource is classified into a base station scheduling mode (mode 1) and a UE selection mode (mode 2). In the base station scheduling mode (mode 1), the base station indicates a resource pool to which a currently scheduled resource belongs. In the UE selection mode (Mode 2), after a UE determines the sidelink resource, behavior of the UE is similar to behavior of the base station in the base station scheduling mode. However, before determining the sidelink resource, the UE is to autonomously select a resource pool. Specifically, for Mode 2, the foregoing selection is randomly performed, or is performed based on a result of sensing or partial sensing.

Generally, two results are obtained in response to a channel access process being performed: The channel access process is completed (which is also referred to as an LBT success) and the channel access process is not completed (which is also referred to as an LBT failure). There are a plurality of time domain start locations in a time-frequency resource used for data transmission. in response to a channel being determined to be idle before any time domain start location, the channel access process is completed. in response to the channel being determined to be busy before all time domain start locations, the channel access process is not completed.

In response to determining that the consistent LBT failures occur on a carrier or in a resource pool on a sidelink, the first terminal sends a media access control (MAC) control element (CE) indicating the LBT failures to the network device. The MAC CE includes a plurality of resource pool identifier fields, and further includes information about a carrier to which the resource pool belongs, for example, a carrier identifier field.

In at least one embodiment, the configuration information includes a maximum quantity of times of the LBT failures and a timer length. A physical (PHY) entity of the first communication device indicates, to a media access control MAC entity of the first communication device, the LBT failures that occur in the first resource pool. The MAC entity starts a timer corresponding to the first resource pool, and increases a count value of a counter corresponding to the first resource pool based on the LBT failures that occur in the first resource pool. in response to the count value of the counter reaching the maximum, the MAC entity determines that the consistent LBT failures occur in the first resource pool.

The foregoing LBT detection ensures that the first communication device learns of a LBT failure status in real time, to perform processing in a timely manner, and ensure validity of the sidelink communication.

In at least one embodiment, the first communication device stops resource selection in the first resource pool within predetermined time. Alternatively, in response to the consistent LBT failures occurring in all resource pools of the first carrier, the first communication device reselects a second carrier of the sidelink.

Optionally, the first communication device receives second indication information from a second communication device, where the second indication information indicates a second resource pool or a second carrier that is on the sidelink and in or on which the consistent LBT failures occur.

Based on the second indication information, the first communication device determines whether to perform the sidelink communication with the second communication device based on the second resource pool or the second carrier, for example, does not use the foregoing resource within predetermined time, or changes to use another resource, to ensure reliable communication.

In at least one embodiment, the first communication device sends third indication information to the network device, where the third indication indicates the second resource pool or the second carrier.

In a sidelink communication system, a base station provides a same resource pool configuration for terminals served by the base station, to ensure resource configuration consistency. For example, a resource pool configuration provided by a serving base station of the first communication device for the first communication device is the same as a resource pool configuration provided by a serving base station of the second communication device for the second communication device. In this case, in response to the first communication device indicating, to the second communication device, the resource pool in which the consistent LBT failures occur, the second communication device correctly understands.

In at least one embodiment, the third indication information further indicates a unicast connection between the first communication device and the second communication device. The indication enables the network device to sense a specific connection to which consistent LBT failures occur, and to perform differentiated processing accordingly, so that other unicast/broadcast/multicast sidelink communication is not affected while reliability of the unicast connection communication is ensured.

Based on the third information, the network device does not schedule the foregoing resource to the first communication device, or schedule a resource to the first communication device based on another resource pool or carrier, to ensure real-time valid communication between the first communication device and the second communication device, and improve scheduling reliability.

In at least one embodiment, the first communication device selects a resource in a third resource pool or a resource on a third carrier on the sidelink, and performs unicast connection communication with the second communication device based on the resource.

The third resource pool is different from the second resource pool, or the third carrier is different from the second carrier.

In the foregoing manner, during resource selection, a case in which an identified resource on which the consistent LBT failures occur is selected for the unicast connection is avoided. This ensures the reliable unicast connection communication between the first communication device and the second communication device.

For example, the first communication device selects a resource in another resource pool or a resource on another carrier on the sidelink, and performs the unicast connection communication with the second communication device based on the resource. The another resource pool is different from the resource pool in which the consistent LBT failures occur, or the another carrier is different from the carrier on which the consistent LBT failures occur. Alternatively, the first communication device obtains a sidelink grant resource. The grant resource is located in the resource pool in which the consistent LBT failures occur or the carrier on which the consistent LBT failures occur. Therefore, the first communication device does not use the sidelink grant resource to perform the unicast connection communication with the second communication device.

In at least one embodiment, the first communication device obtains a sidelink grant resource, where the grant resource is located in the second resource pool or on the second carrier.

The first communication device does not use the grant resource to perform the unicast connection communication with the second communication device.

In a scenario in which more adaptability is considered, the first communication device determines whether each grant resource is applicable, to ensure the reliable unicast connection communication between the first communication device and the second communication device.

For example, the MAC entity of the first communication device performs a logical channel prioritization (LCP) process. For example, in response to the MAC layer of the first communication device performing the LCP process, the unicast connection between the first communication device and the second communication device is excluded. in response to a physical layer indicating, to the MAC entity, that a current scheduled resource belongs to another resource pool or carrier, and the another resource pool or carrier is used for the unicast connection communication, the first communication device determines, based on a priority, whether to use the resource to send data on the unicast connection.

In at least one embodiment, the first communication device sends fourth indication information to the second communication device, where the fourth indication information indicates the first resource pool or the first carrier in or on which the consistent LBT failures occur. Therefore, a case in which the second communication device sends data to the first communication device based on a resource to which the consistent LBT failures occur is avoided. This improves reliability. In at least one embodiment, in response to the sidelink includes a plurality of carriers, the first indication information further indicates a carrier to which the first resource pool belongs, to ensure accurate indication of the resource pool.

In at least one embodiment, the first communication device receives a sidelink grant resource from the network device. in response to there being no to-be-transmitted data in a process corresponding to the grant resource, the first communication device skips or suspends LBT detection on the grant resource. Therefore, unnecessary LBT is avoided, and power is saved.

In at least one embodiment, the first communication device receives a sidelink grant resource from the network device, and the first communication device performs LBT detection on the grant resource. in response to there being to-be-transmitted data in a process corresponding to the grant resource, the first communication device feeds back a negative acknowledgment (NACK) to the network device. Alternatively, in response to there being no to-be-transmitted data in a process corresponding to the grant resource, the first communication device feeds back an acknowledgment (ACK) to the network device. Therefore, the first communication device is enabled to indicate the NACK to the base station in a proper scenario, to ensure timely retransmission scheduling and reliable communication.

Based on the foregoing behavior of the communication device, a case in which the network device performs invalid or useless resource scheduling is avoided. This achieves resource scheduling validity.

In at least one embodiment, the communication devices are terminals, and the network device is the base station; or the network device apparatus is a central unit (CU).

According to a second aspect, a sidelink communication method is provided. The method includes: A first communication device receives first indication information from a second communication device, where the first indication information indicates a first resource pool or a first carrier that is on a sidelink and in or on which an LBT failure occurs. In addition, the first communication device sends second indication information to a network device, where the second indication information indicates the first resource pool or the first carrier.

In at least one embodiment, the second indication information further indicates a unicast connection between the first communication device and the second communication device.

In at least one embodiment, the first communication device selects a resource in a second resource pool or a resource on a second carrier on the sidelink, and performs unicast connection communication with the second communication device based on the resource.

The second resource pool is different from the second resource pool, or the second carrier is different from the second carrier.

In at least one embodiment, the first communication device obtains a sidelink grant resource, where the grant resource is located in the first resource pool or on the first carrier. The first communication device does not use the grant resource to perform the unicast connection communication with the second communication device.

In at least one embodiment, in response to the sidelink includes a plurality of carriers, the first indication information further indicates a carrier to which the first resource pool belongs.

In at least one embodiment, the first communication device receives a sidelink grant resource from the network device. in response to there being no to-be-transmitted data in a process corresponding to the grant resource, the first communication device skips or suspends LBT detection on the grant resource.

In at least one embodiment, the first communication device receives a sidelink grant resource from the network device. The first communication device performs LBT detection on the grant resource. in response to there is to-be-transmitted data in a process corresponding to the grant resource, the first communication device feeds back a NACK to the network device. Alternatively, in response to there being no to-be-transmitted data in a process corresponding to the grant resource, the first communication device feeds back an ACK to the network device.

In at least one embodiment, the communication device is a terminal, and the network device is a base station; or the network device apparatus is a CU.

According to a third aspect, a sidelink communication method is provided. The method includes: A network device sends configuration information to a first communication device, where the configuration information is associated with a first carrier or a first resource pool, and the first resource pool belongs to the first carrier. In addition, the network device receives first indication information from the first communication device, where the first indication information indicates the first resource pool in which consistent LBT failures occur.

In at least one embodiment, the configuration information includes a maximum quantity of times of the LBT failures and a timer length.

In at least one embodiment, the first indication information further indicates a unicast connection between the first communication device and a second communication device.

In at least one embodiment, in response to a sidelink including a plurality of carriers, the first indication information further indicates a carrier to which the first resource pool belongs.

According to a fourth aspect, an apparatus used in sidelink communication is provided. The apparatus is configured to perform operations of the communication devices in the first aspect, and the second aspect. Specifically, the apparatus includes modules and units configured to perform the operations of the communication devices in any implementation of the first aspect or the second aspect.

According to a fifth aspect, an apparatus used in sidelink communication is provided. The apparatus is configured to perform operations of the network device in the third aspect. Specifically, the apparatus includes modules and units configured to perform the operations of the network device in any implementation of the third aspect.

According to a sixth aspect, a terminal device is provided. The terminal device includes a processor, a transceiver, and a memory. The processor, the transceiver, and the memory communicate with each other through an internal connection path. The memory is configured to store instructions, and the processor is configured to execute the instructions stored in the memory. in response to the processor executing the instructions stored in the memory, the execution enables the terminal device to perform any method in any implementation of the first aspect or the second aspect, or the execution enables the terminal device to implement the apparatus provided in the fourth aspect.

According to a seventh aspect, a network device is provided. The network device includes a processor, a transceiver, and a memory. The processor, the transceiver, and the memory communicate with each other through an internal connection path. The memory is configured to store instructions, and the processor is configured to execute the instructions stored in the memory. in response to the processor executing the instructions stored in the memory, the execution enables the network device to perform any method in any implementation of the third aspect, or the execution enables the network device to implement the apparatus provided in the fifth aspect.

According to an eighth aspect, a chip system is provided, including a memory and a processor. The memory is configured to store a computer program, and the processor is configured to invoke the computer program from the memory and run the computer program, so that a device (for example, a network device or a terminal device) onto which the chip system is installed performs any method in any one of the first aspect, the second aspect, or the third aspect and the implementations of the first aspect, the second aspect, or the third aspect.

According to a ninth aspect, a computer program product is provided. The computer program product includes computer program code. in response to the computer program code being run by a communication unit and a processing unit or by a transceiver and a processor of a device (for example, a network device or a terminal device), the communication device performs any method in any one of the first aspect, the second aspect, or the third aspect and the implementations of the first aspect, the second aspect, or the third aspect.

According to a tenth aspect, a computer-readable storage medium is provided. The computer-readable storage medium stores a program, and the program enables a device (for example, a network device or a communication device) to perform any method in any one of the first aspect, the second aspect, or the third aspect and the implementations of the first aspect, the second aspect, or the third aspect.

According to an eleventh aspect, a computer program is provided. in response to the computer program being executed on a computer, the computer is enabled to implement any method in any one of the first aspect, the second aspect, or the third aspect and the implementations of the first aspect, the second aspect, or the third aspect.

DESCRIPTION OF EMBODIMENTS

The following clearly describes the technical solutions in at least one embodiment with reference to the accompanying drawings.

Figure 1A:
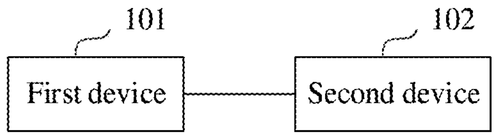
FIG. 1*a* is a schematic diagram of a communication system according to at least one embodiment.

To resolve a problem in the conventional technology that transmission between terminals cannot be performed in different communication scenarios, at least one embodiment provides a technical solution based on a communication system in FIG. 1*a*, to improve transmission validity in the communication system.

FIG. 1*a* is a schematic diagram of a system architecture to which at least one embodiment is applicable. The system architecture shown in FIG. 1*a* includes a second device 101 and a first device 102. The second device in at least one embodiment is connected to the first device in a wireless manner. In other words, the second device communicates with the first device through a wireless network. FIG. 1*a* is merely a schematic diagram of the communication system architecture. A quantity of first devices and a quantity of second devices in the communication system are not limited in at least one embodiment. In this embodiment, the wireless manner is understood as sidelink communication and/or wireless link communication.

Figure 1B:
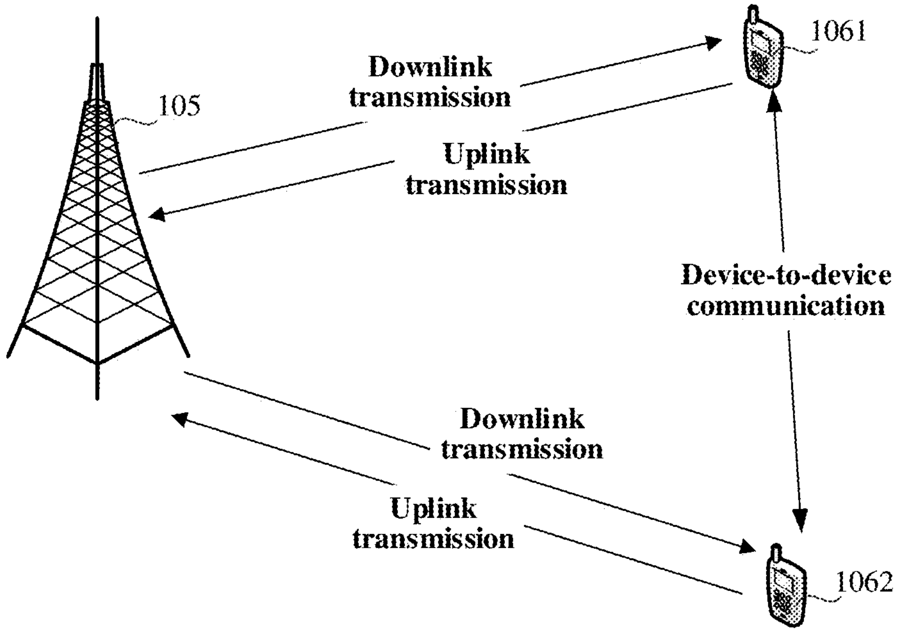
FIG. 1*b* is a schematic diagram of a communication system according to at least one embodiment.

In an example, the first device and the second device in the foregoing system architecture performs the sidelink communication. FIG. 1*b* is a schematic diagram of a sidelink communication scenario. As shown in FIG. 1*b*, in the communication scenario, a network device 105 and one or more terminal devices (for example, a terminal device 1061 and a terminal device 1062) is included. Data transmission is performed between the network device 105 and each of the terminal device 1061 and the terminal device 1062 through an air interface resource, and data transmission is performed between the terminal device 1061 and the terminal device 1062 through a sidelink resource. The first device is the terminal device 1061, and the second device is the terminal device 1062, or vice versa. In FIG. 1*b*, uplink transmission is used as an example. A data channel on which uplink data transmission is performed between the network device 105 and the terminal device (the terminal device 1061 or the terminal device 1062) is carried on a first uplink (UL) carrier or a supplementary uplink (SUL) carrier. A data channel on which data transmission is performed between the terminal device 1061 and the terminal device 1062 is carried on an SL carrier. In an example, the SL carrier is a second UL carrier. The first UL carrier and the second UL carrier are a same carrier.

Sidelink (SL) communication is a technology that allows terminal devices to communicate with each other, and a resource used to carry communication of the terminal devices is referred to as a sidelink resource. Because the sidelink communication implements direct communication between different terminal devices, a high data rate, a low delay, and low power consumption is implemented. The sidelink communication includes, for example, vehicle-to-vehicle, vehicle-to-infrastructure, vehicle-to-pedestrian, and device-to-device communication. in both an industrial internet communication scenario and a wireless grid network communication scenario, a sidelink communication technology is used.

Figure 1C:
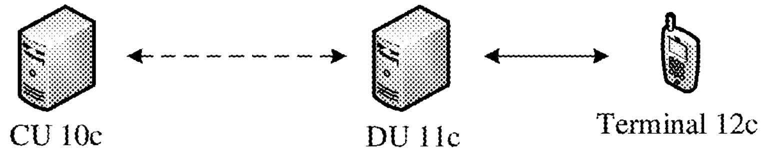
FIG. 1*c* is a schematic diagram of a communication system according to at least one embodiment.

As shown in FIG. 1*c*, the communication system includes at least a central unit (CU) 10*c* and a distributed unit (DU) 11*c*. The DU 11*c* communicates with a terminal 12*c*. For example, some functions of an NR base station are deployed on the CU, and remaining functions are deployed on the DU. In this case, there are one or more DUs, and a plurality of DUs share one CU. This reduces costs and facilitates network expansion. Specifically, CU-DU division is performed based on protocol stacks. In at least one embodiment, at least one of the following protocol layers is deployed on the CU: a radio resource control (RRC) layer, a service data adaptation protocol (SDAP) layer, and a packet data convergence protocol (PDCP) layer. At least one of the following remaining protocol layers is deployed on the DU: a radio link control (RLC) layer, a media access control (MAC) layer, or a physical layer. The CU and the DU are connected through an F1 interface. The CU represents a connection between the NR base station and an NR core network. A person skilled in the art understands that the CU and the DU are located on different physical entities or are independent of the NR base station. In other words, the CU and the DU are combined to implement functions of the NR base station or replace the NR base station.

In the foregoing network architecture, signaling generated by the CU is sent to the terminal device through the DU, or signaling generated by the terminal device is sent to the CU through the DU. The DU transparently transmits the signaling to the terminal device or the CU by directly encapsulating the signaling at a protocol layer without parsing the signaling. In the following embodiments, in response to transmission of such signaling between the DU and the terminal device being involved, sending or receiving of the signaling by the DU includes this scenario. For example, signaling at the RRC or PDCP layer is eventually processed as signaling at the PHY layer to be sent to the terminal device, or is converted from received signaling of the PHY layer. In this architecture, the signaling at the RRC layer or the PDCP layer is sent by the DU, or sent by the DU and a radio frequency apparatus.

The system architecture and the service scenario described in at least one embodiment are intended to describe the technical solutions in at least one embodiment more clearly, and do not constitute a limitation on the technical solutions provided in at least one embodiment. A person of ordinary skill in the art knows that: With evolution of the network architecture and emergence of new service scenarios, the technical solutions provided in at least one embodiment are also applicable to similar technical problems.

The technical solutions in at least one embodiment is applied to various communication systems, such as a global system for mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, a new radio (NR) system, or the like. The technical solutions in at least one embodiment are further applied to device-to-device (D2D) communication, machine-to-machine (M2M) communication, machine type communication (MTC), and communication in an internet of vehicles system. Communication manners in the internet of vehicles system are collectively referred to as V2X (X represents everything). For example, the V2X communication includes vehicle-to-vehicle (V2V) communication, vehicle-to-infrastructure (V2I) communication, vehicle-to-pedestrian (V2P) communication, or vehicle-to-network (V2N) communication.

The network device in the communication system is any device that has a wireless transceiver function or a chip that is disposed in the device. The device includes but is not limited to an evolved NodeB (eNB), a radio network controller (RNC), a NodeB (NB), a base station controller (BSC), a base transceiver station (BTS), a home NodeB (for example, a home evolved NodeB, or a home NodeB, HNB), a donor eNB (DeNB), a baseband unit (BBU), an access point (AP), a wireless relay node, a wireless backhaul node, a transmission point (TP), a transmission and reception point (TRP), and the like in a wireless fidelity (Wi-Fi) system. Alternatively, the device is a gNB or a transmission point (TRP or TP) in a 5G system, for example, an NR system, is an antenna panel or a group of antenna panels (including a plurality of antenna panels) of a base station in a 5G system, or is a network node, for example, a baseband unit (BBU) or a distributed unit (DU) that constitutes a gNB or a transmission point.

In some deployments, the gNB includes the CU and the DU. The gNB further includes a radio frequency unit (RFU). The CU implements some functions of the gNB, and the DU implements some functions of the gNB. Information at the RRC layer eventually becomes information at the PHY layer, or is converted from the information at the PHY layer. Therefore, in the architecture, higher layer signaling such as RRC layer signaling or PHCP layer signaling are alternatively considered as being sent by the DU or sent by the DU and the RU. the network device is a CU node, a DU node, or a device including a CU node and a DU node. In addition, the CU is classified as a network device in an access network RAN, or the CU is classified as a network device in a core network CN. This is not limited herein.

A terminal device in the communication system is also referred to as a user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in at least one embodiment is a mobile phone, a tablet (Pad), a computer having a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited in at least one embodiment. In at least one embodiment, the foregoing terminal device and a chip that is disposed in the foregoing terminal device are collectively referred to as a terminal device. For ease of understanding of embodiments described herein, before the communication method is described, concepts in at least one embodiment are first briefly described.

For ease of understanding, related terms and technologies in at least one embodiment are first briefly described.

Spread Type of Sidelink Communication

A sidelink communication system is similar to a wireless communication system, and also supports broadcast, unicast, and multicast transmission manners. Broadcast communication is similar to a case in which a base station broadcasts system information to a terminal. For example, the base station sends data of a broadcast service to the UE without encryption, and another UE within a valid receiving range receives the broadcast service data in response to the UE being interested in the broadcast service. Unicast communication is similar to data communication performed after an RRC connection is established between the UE and the base station. A unicast connection is to be first established between two UEs. After the unicast connection is established, the two UEs perform data communication based on a negotiated identifier. Data may or may not be encrypted. Compared with the broadcast communication, the unicast communication is performed only between two UEs that establish the unicast connection. Multicast communication refers to communication between all UEs in a communication group, and any UE in the group receives and sends data of a multicast service.

Specifically, broadcast transmission is referred to as broadcast sidelink signal communication, or is referred to as sidelink communication of a broadcast service, or sidelink communication whose transmission type is broadcast. Multicast transmission is referred to as multicast sidelink signal communication, or is referred to as sidelink communication of a multicast service, or sidelink communication whose transmission type is multicast. The unicast communication is referred to as unicast sidelink signal communication, or is referred to as sidelink communication of a unicast service, or sidelink communication whose transmission type is unicast.

Based on any one of the foregoing spread types, in response to data transmission being performed on a sidelink, a source identifier (source ID) and a destination identifier (destination ID) are to be carried. In this embodiment, the identifiers are for a layer 2 (L2) of a UE. Specifically, an upper layer of the UE is a PC5-S layer, and is used for communication between UEs. The upper layer is referred to as a non-access stratum (NAS), a V2X layer, or a PC5-S layer. The layer 2 of the UE is an AS layer, and is used for communication between a terminal and a base station. For the broadcast communication, the destination identifier corresponds to a broadcast service, and the source identifier is understood as an identifier of a sending end UE. For the unicast communication, the destination identifier is an L2 identifier allocated by a receiving end UE to a unicast connection, and the source identifier is an L2 identifier allocated by the sending end UE to the unicast connection. For the multicast communication, the destination identifier corresponds to a group, and the source identifier is understood as an identifier of the sending end UE.

Figure 2A:
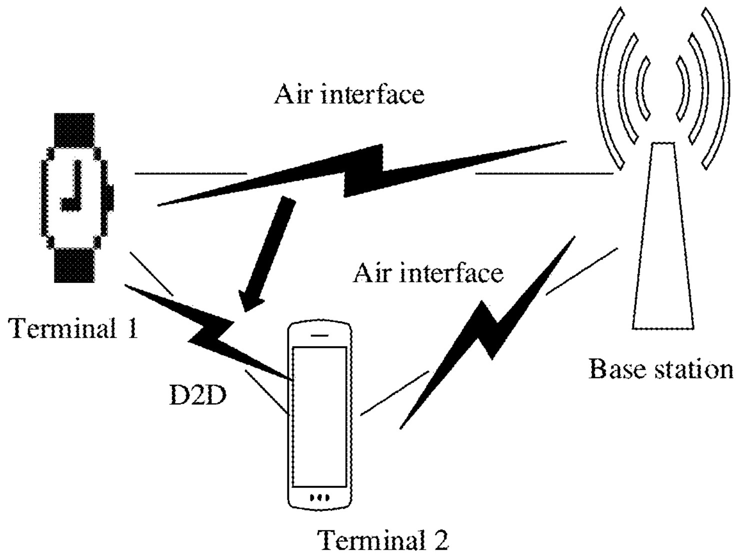
FIG. 2*a* is a schematic diagram of a communication system according to at least one embodiment.
Figure 2B:
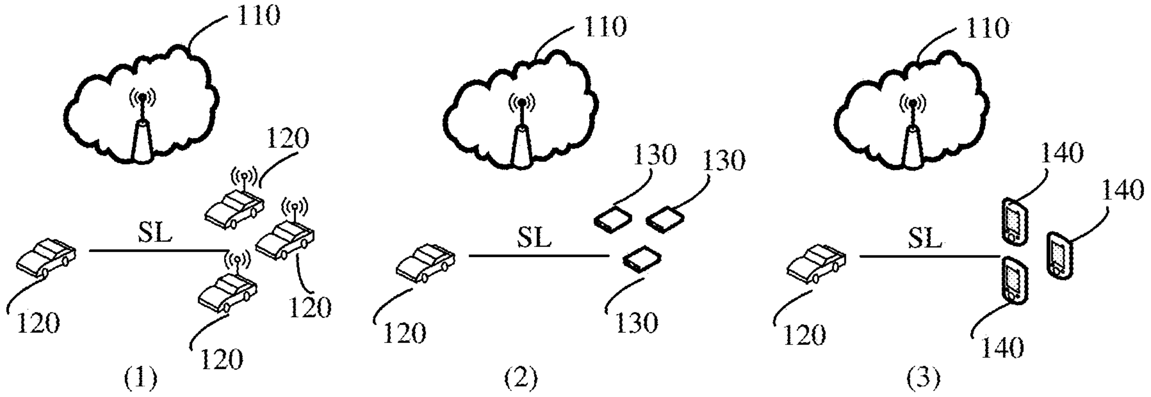
FIG. 2*b* is a schematic diagram of a communication system according to at least one embodiment.

In at least one embodiment, as shown in FIG. 2*a* and FIG. 2*b*, data is received and sent on a D2D or V2X sidelink (SL). The SL refers to a D2D link shown in FIG. 2*a* and an SL link shown in FIG. 2*b*. On the SL, data transmitted between terminal devices is not forwarded by a network device. In other words, the SL is a transmission link between the terminal devices.

As shown in FIG. 2*b*, a vehicle obtains road condition information or receives an information service in a timely manner through V2V, V2I, V2P, or V2N communication. These communication manners are collectively referred to as V2X communication. In FIG. 2*b*, FIG. 1), FIG. 2), and FIG. 3) are respectively schematic diagrams of V2V, V2I, and V2P communication. 110 is a network device. 120 represents a vehicle, 130 represents a roadside infrastructure, and 140 represents a pedestrian. Most common V2V communication and V2I communication are used as an example. As shown in FIG. 1) in FIG. 2*b*, a vehicle broadcasts, to a surrounding vehicle through the V2V communication, information about the vehicle such as a vehicle speed, a driving direction, a specific position, and whether an emergency brake is stepped on. A driver of the surrounding vehicle obtains the information, to better perceive a traffic condition outside a line of sight, to predict a dangerous condition in advance and avoid the dangerous condition. For the V2I communication shown in FIG. 2) in FIG. 2*b*, in addition to the foregoing exchange of security information, the roadside infrastructure, for example, a road side unit (RSU), provides various types of service information and data network access for a vehicle, and functions such as electronic toll collection and in-vehicle entertainment greatly improve traffic intelligence.

Sidelink Resource

The sidelink resource is a resource used for communication between terminals. The sidelink resource includes a sidelink resource in frequency domain and a sidelink resource in time domain.

From the perspective of a transmission type, the sidelink resource includes a sidelink sending resource and a sidelink receiving resource. The sidelink sending resource is used to send information, for example, send control information and/or data. The sidelink receiving resource is used to receive information, for example, receive control information and/or data. A person skilled in the art understands that the sending resource and the receiving resource are located in a same time domain and/or frequency domain range. For example, based on a time division system, sending and receiving share a same frequency domain resource. Based on a frequency division system, sending and receiving share a same time domain resource.

Optionally, the sidelink signal includes control information and/or data and/or feedback information carried on a sidelink channel.

Optionally, the control information is information used to schedule data, for example, downlink control information (DCI) and sidelink control information (SCI) in the conventional technology. The feedback information includes information for feeding back, for example, uplink control information (UCI) and sidelink feedback information (SFI) in the conventional technology. The control information is carried on a control channel, for example, a PSCCH, namely, a physical sidelink control channel. The feedback information is carried on a feedback channel, for example, a PSFCH, namely, a physical sidelink feedback channel.

Optionally, the data is a signal in a broad sense, is a data packet, or is a transport block or a codeword. The data is carried on a data channel, for example, a physical sidelink shared channel (PSSCH).

Sidelink Data Radio Bearer

Communication in an NR sidelink network is classified based on service flows. For example, an IP flow or an Ethernet flow is understood as corresponding to different services. The foregoing service flows are classified into different quality of service (QoS) flows based on different QoS parameters or features. Specifically, a base station maps the QoS flow to a sidelink data radio bearer (DRB), or defines a mapping relationship between the QoS flow and the sidelink DRB. For example, the base station maps different QoS flows to different sidelink DRBs, or maps QoS flows with similar parameters to a same sidelink DRB. A terminal establishes a sidelink DRB based on the mapping relationship, and sends a corresponding QoS flow to another terminal through the sidelink DRB. The sidelink DRB is a DRB used to transmit data between the terminals. Optionally, the terminal alternatively determines the mapping relationship based on a preconfiguration, and establishes the sidelink DRB.

Sidelink Logical Channel

Data is classified based on different types of transmission services of a terminal, and correspond to different logical channels. Correspondingly, logical channel information is a logical channel (LCH) identifier and/or a logical channel group (LCG) identifier. A person skilled in the art understands that any identifier used to identify the logical channel or the logical channel group falls within the protection scope of at least one embodiment. The LCG includes at least one LCH. For example, four LCHs or eight LCHs each form one LCG. A difference is that data volumes of LCGs formed by LCHs of different quantities are different. Generally, resource types corresponding to different LCHs are the same or different, resource types corresponding to different LCHs in one LCG are the same or different, and one LCH corresponds to at least one resource type. For another example, a priority sequence of different LCHs/LCGs is determined by a feature of data carried in the LCHs/LCGs. The priority sequence of the LCHs/LCGs is understood as a sequence in which the terminal sends data to the base station. For example, the priority sequence of the LCHs/LCGs is determined based on any one or more of the following cases:

strictness of delay parameters of data;

data volume;

waiting time of the data in a buffer; or data type.

Alternatively, a priority of the LCG is associated with an LCH in the LCG. For example, the LCG includes an LCH 1 and an LCH 2, and a priority of the LCG 1 is higher than a priority of the LCG 2. In this case, for the priority of the LCG, reference is made to the priority of the LCG 1, or the priority of the LCG is the same as the priority of the LCG 1.

In at least one embodiment, terms "network" and "system" are usually interchangeably used, but meanings of the terms are understood by a person skilled in the art. Terms "component carrier", "carrier unit", and "carrier" are usually interchangeably used, but a person skilled in the art understands meanings of the terms. "information", "signal", "message", and "channel" are interchangeably used sometimes. Meaning expressed by the terms are consistent in response to differences of the terms not being emphasized. Terms "of" and "corresponding (relevant)" are interchangeably used sometimes. Meaning expressed by the terms are consistent in response to differences of the terms not being emphasized.

In at least one embodiment, "identifier (ID)" and "index" are usually interchangeably used, but a person skilled in the art understands meanings of the terms. Meaning expressed by the terms are consistent in response to differences of the terms not being emphasized.

In at least one embodiment, "at least one" means "one or more". For example, that at least one of manner A, manner B, or manner C is used for implementation means that manner A is used for implementation, manner B is used for implementation, or manner C is used for implementation; or means that manner A and manner B is used for implementation, manner B and manner C is used for implementation, or manner A and manner C is used for implementation; or means that manner A, manner B, and manner C is used for implementation. Similarly, "at least two" means "two or more".

In at least one embodiment, "first", "second", "third", and the like are intended to distinguish between different objects, but should not constitute any limitation on at least one embodiment.

The term "and/or" describes an association relationship for describing associated objects and represents that three relationships exist. For example, A and/or B represents the following three cases: Only A exists, both A and B exist, and only B exists. The character "/" generally indicates an "or" relationship between the associated objects. "At least one", similar to "A and/or B", describes an association relationship between associated objects and represents that three relationships exist. For example, at least one of A and B represents the following three cases: Only A exists, both A and B exist, and only B exists. The technical solutions provided in at least one embodiment are described in detail below with reference to the accompanying drawings.

In at least one embodiment, a V2X system is used as an example. Regardless of broadcast, unicast, or multicast, in response to terminals in a coverage area of a sidelink normally communicating with each other, an LBT process generally is to be first performed, to find an available or idle sidelink resource in an available or idle unlicensed spectrum, to perform information transmission.

A manner of obtaining the sidelink resource is classified into a base station scheduling mode (mode 1) and a UE selection mode (mode 2).

In the base station scheduling mode (Mode 1), a base station indicates a resource pool to which a currently scheduled resource belongs. Specifically, the base station schedules a resource for a UE by using DCI, or allocates a sidelink configured grant to the UE by using an RRC message.

In the UE selection mode (Mode 2), after a UE determines the sidelink resource, behavior of the UE is similar to behavior of the base station in the base station scheduling mode. However, before determining the sidelink resource, the UE is to autonomously select a resource pool. One possibility is that the UE performs selection. In other words, the UE autonomously determines to select a specific resource pool. For example, the UE receives a resource pool configuration from the base station, or obtains the resource pool configuration from a preconfiguration, and then selects a resource from the resource pool to perform sidelink communication.

Specifically, the foregoing selection is randomly performed, or is performed based on a result of sensing or partial sensing. The sensing is also understood as full sensing. The terminal continuously senses a sidelink channel, for example, a physical sidelink control channel (PSCCH) on a sidelink, or SCI, to determine available resources. Compared with the full sensing, the partial sensing, as the name indicates, involves the terminal sensing only some time domain resources to determine the available resources. The partial sensing saves more power than the full sensing. For random selection in some resource pools, the sensing or the partial sensing are not performed, and the available resources are randomly selected. The time domain resource is a time unit, for example, a frame, a subframe, a slot, a symbol, or the like, on the sidelink. This is not limited in at least one embodiment.

Generally, LBT is performed by using a channel (for example, 20 MHz) as a granularity. Before sending a signal (for example, a data signal) on a channel (for example, denoted as a first channel), a communication device first detects whether the first channel is idle, for example, detect whether a nearby communication device is occupying the first channel to send a signal. The detection process is referred to as a clear channel assessment (CCA) process or a channel access process.

Specifically, two types of channel access processes exist, and are denoted as a first-type channel access process and a second-type channel access process.

The first-type channel access process (which is also referred to as a fixed duration-based channel access process):

In fixed duration-based energy detection, for a specific bandwidth (for example, 20 megahertz or 20 MHz), in response to signal energy received by a communication device (which is a terminal, or is a network device) within fixed duration being less than or equal to a first preset threshold, the channel is idle, so that the communication device uses the idle channel to transmit data. Otherwise, the channel is busy, so that the communication device does not use the busy channel to transmit data.

Alternatively, in the fixed duration-based channel access process, a communication device detects fixed duration. in response to signal energy detected in the channel being less than a preset threshold within the fixed duration, the channel is in an idle state, and the channel is occupied. Otherwise, channel contention is to be performed again.

The second-type channel access process (which is also referred to as a rollback-based channel access process):

In rollback mechanism-based energy detection, a window is defined for a specific bandwidth, and the window defines a range of a quantity of slots to be detected. A communication device randomly selects a value A from the window (or a value range). After detecting at least A slots on which idle energy detection is performed, the communication device considers that a channel is idle, so that the communication device uses the channel to transmit data. Otherwise, the channel is considered busy, so that the communication device does not use the busy channel to transmit data. The idle energy detection means that signal energy received in fixed duration is less than or equal to a second preset threshold. The first preset threshold and the second preset threshold are predefined, for example, predefined in a protocol. This is not limited. In addition, there is no limitation relationship between the first preset threshold and the second preset threshold, and the first preset threshold and the second preset threshold is the same or are different.

Specifically, the communication device randomly selects the value A in a contention window. After detecting at least A idle slots, the communication device determines that the channel is in an idle state, so that the channel is occupied. Otherwise, channel contention is to be performed again. The idle slot means that signal energy detected in the channel in one slot is less than the preset threshold. In this type of channel access process, four channel access priority classes (CAPCs) are introduced. Different CAPCs correspond to different channel access parameters. The channel access parameters include a size of a contention window, a corresponding service status, channel occupancy time (COT) information, and the like. The COT is duration for which a channel is used after a channel access process succeeds.

Two results are obtained in response to the channel access process being performed: The channel access process is completed (which is also referred to as an LBT success) and the channel access process is not completed (which is also referred to as an LBT failure). There are a plurality of time domain start locations in a time-frequency resource used for data transmission. in response to a channel being determined to be idle before any time domain start location, the channel access process is completed. in response to the channel being determined to be busy before all time domain start locations, the channel access process is not completed.

A difference lies in that in a licensed spectrum-based operation scenario, after obtaining a scheduled resource, the UE directly uses the resource to perform service transmission. However, in an unlicensed spectrum-based operation scenario, after obtaining the scheduled resource, the UE further performs LBT on the resource, and uses the resource to perform service transmission after the LBT succeeds.

In at least one embodiment, an unlicensed spectrum is applied in sidelink communication to perform a valid LBT process on a sidelink, so that sidelink communication reliability is achieved, and communication efficiency between terminals is improved. The following provides detailed descriptions.

Figure 3:
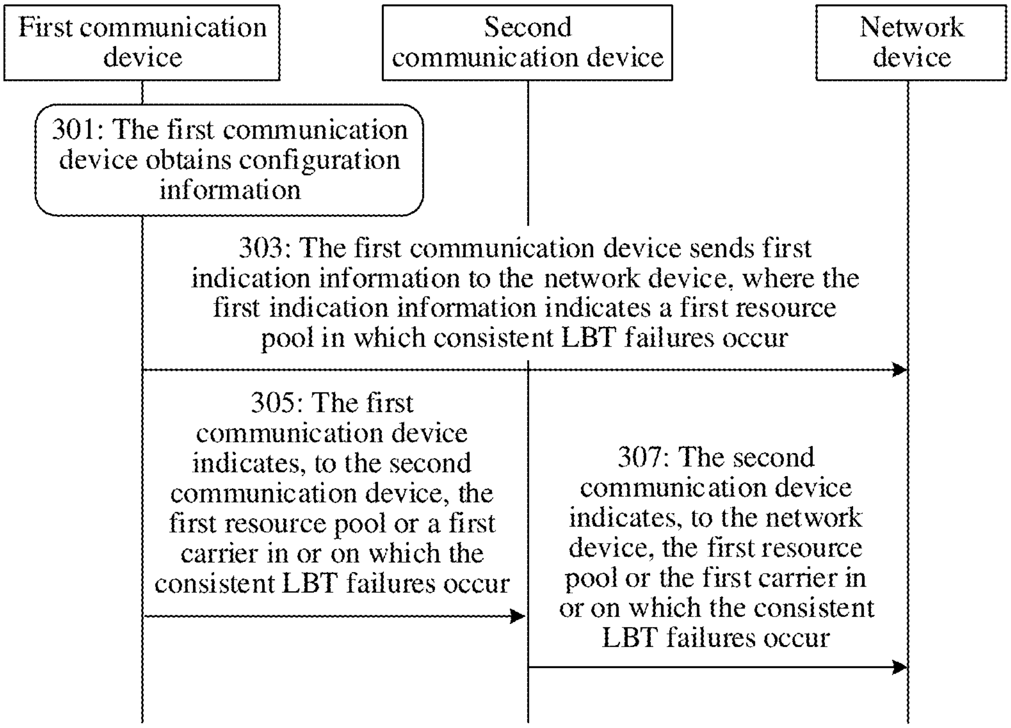
FIG. 3 is a schematic flowchart of a plurality of communication methods according to at least one embodiment.

FIG. 3 is a schematic flowchart of a communication method according to at least one embodiment. In a sidelink scenario, a communication device is used as a terminal, and a network device is used as a base station for description. The communication device and the network device each is a chip, or is implemented by a chip. This is not limited in at least one embodiment. For ease of description, the communication device described below is also referred to as the terminal or a UE.

The method includes the following steps.

301: A first communication device obtains configuration information. The configuration information is used by the first communication device to detect consistent listen before talk LBT failures that occur in a first resource pool, the configuration information is associated with a first carrier or the first resource pool, and the first resource pool belongs to the first carrier.

303: The first communication device sends first indication information to the network device. The first indication information indicates the first resource pool in which the consistent LBT failures occur.

Figures 3A, 3B, 3C:
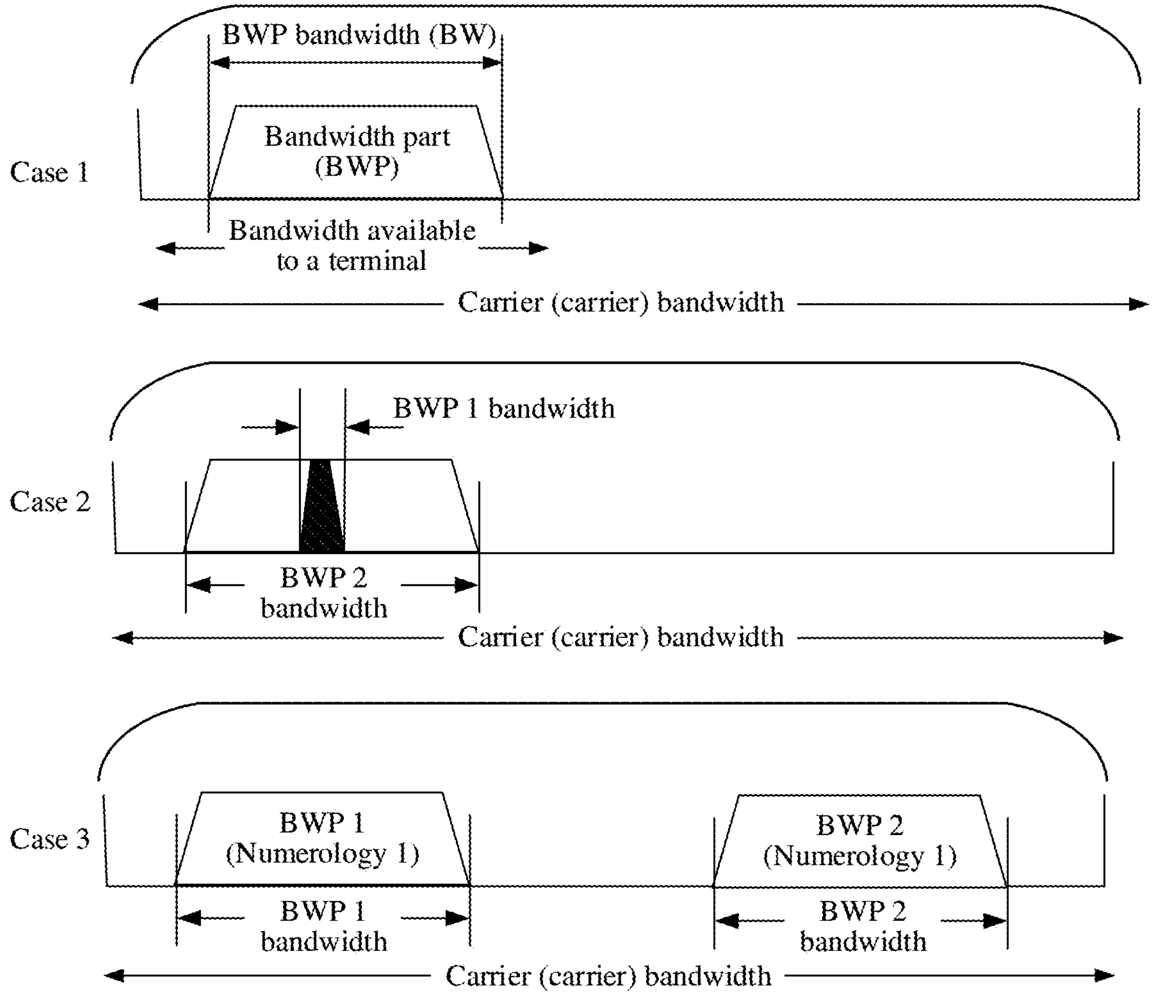
FIG. 3*a* is a schematic diagram of a BWP according to at least one embodiment.
FIG. 3*b* is a schematic diagram of a MAC CE according to at least one embodiment.
FIG. 3*c* is a schematic diagram of another MAC CE according to at least one embodiment.

Generally, a bandwidth of a carrier in NR is wider than a bandwidth of a carrier in LTE. For example, the bandwidth of the carrier in the NR is 100 MHz. However, different terminals have different radio frequency capabilities, and support different maximum bandwidths. Therefore, a concept of a bandwidth part (BWP) is introduced. FIG. 3*a* is a schematic diagram of a BWP. The BWP is a group of continuous RB resources on a carrier. Different BWPs occupy frequency domain resources that partially overlap but have different bandwidths, or are bandwidth resources that have different numerologies and that do not overlap in frequency domain. An example in which a maximum of four BWPs is configured for one terminal device is used for description. For example, four BWPs are configured in frequency division duplex (FDD), or four BWPs are configured in time division duplex (TDD). One BWP is simultaneously activated on each carrier, and data is sent and received between terminals on the activated BWP based on a sidelink.

In at least one embodiment, the network device configures the BWPs for the terminal on an unlicensed spectrum, and activates one of the configured BWPs. The terminals perform sidelink communication with each other by using the unlicensed spectrum. That the configuration information is associated with the first carrier or the first resource pool is also understood as that the configuration is based on a carrier granularity or a BWP granularity, or is based on a resource pool granularity. The carrier granularity is understood as that LBT detection is independently configured by using a carrier as a granularity. The BWP granularity is understood as that the LBT detection is independently configured by using a BWP as a granularity. The resource pool granularity is understood as that the LBT detection is independently configured by using a resource pool as a granularity. Optionally, one carrier includes one or more BWPs, and one BWP includes one or more resource pools. in response to one carrier including one BWP, the BWP granularity is the carrier granularity. Therefore, the resource pool granularity enables flexible configuration of a network, and the carrier granularity or the BWP granularity reduces signaling overheads.

In 301, the first terminal obtains a resource pool configuration in different manners. In a first manner, the network device, for example, the base station, configures the resource pool for the first terminal through dedicated signaling or system broadcast. In a second manner, the first terminal obtains the resource pool based on a preconfiguration. The preconfiguration is pre-stored in the terminal or in a subscriber identity module (SIM) card, or the terminal device receives the configuration from a core network. The SIM card is also referred to as a telephone card, or a smart card mainly used to store information such as subscriber identity data, SMS data, and a phone number.

In the first manner, the network device configures the resource pool. This corresponds to Mode 1. In the second manner, the first terminal configures the resource pool. This corresponds to Mode 2. In other words, in the first manner, the resource pool configuration is provided by the network device for the first terminal, to ensure that a network access terminal obtains a valid resource pool configuration and perform sidelink communication based on the resource pool configuration. In the second manner, the resource pool configuration is preconfigured in the first terminal or in the SIM card, to ensure that the first terminal performs sidelink communication based on the preconfigured resource pool in response to there being no network coverage.

In the first manner, the configuration information received by the first terminal sent by the base station is sent by the base station to the UE through broadcast or RRC dedicated signaling. For example, in response to the UE being in an idle state or an inactive state, the base station sends the configuration information to the UE through a broadcast message. in response to the UE being in a connected state, the base station sends the configuration information to the UE through the RRC dedicated signaling.

For example, an access network device or the base station sends system information or RRC common information to the terminal. The system information or the RRC common information is a cell-level parameter. A resource pool is configured for the terminal through system information configuration or RRC common information configuration. During specific implementation, the access network device sends the system information or the RRC common information to the terminal, and the system information or the RRC common information is used to configure the resource pool for each terminal. Because the system information or the RRC common information is sent to the terminal, the configuration information sent by using the system information or the RRC common information is used for multicast transmission between the terminals. For example, a sending end UE multicasts data and/or control information by using a sidelink resource configured by using the system information or the RRC common information, and another terminal, for example, a receiving end UE, receives the data or the control information in a corresponding sidelink resource pool.

For another example, an access network device or the base station sends RRC dedicated information to the terminal. The RRC dedicated information is a terminal-level parameter (or referred to as a UE-level parameter) used to perform parameter configuration on the terminal. In a configuration manner of the RRC dedicated information, a resource pool is configured for a single terminal. During specific implementation, the access network device sends the RRC dedicated information to the single terminal, and the RRC dedicated information is used to configure the resource pool for the terminal. Because the RRC dedicated information is sent to the single terminal, the configuration information sent by using the RRC dedicated information is used for unicast transmission between the terminals. For example, a terminal 1 sends data or control information to a terminal 2 in a unicast manner by using the configuration information sent by using the RRC dedicated information.

Alternatively, an operator preconfigures a sidelink resource pool for the terminal, or preconfigures the sidelink resource pool for the terminal in a predefined manner in a standard protocol. In a preconfiguration manner, the resource pool configuration is performed on one or more terminals. During specific implementation, a core network device (for example, a policy control function network element, PCF network element) separately sends preconfiguration information to each terminal, and the preconfiguration information is used to separately perform the resource pool configuration on each terminal. Because the preconfiguration information is sent to a plurality of terminals, the preconfiguration information is used for broadcast transmission between the terminals. For example, a terminal 1 broadcasts data and/or control information by using the preconfiguration information, and another terminal, for example, a terminal 2 receives the data and/or controls the information based on the preconfiguration information.

In actual application, the system information, the RRC common information, the RRC dedicated information, or the preconfiguration information are all used for broadcast, multicast, and/or unicast information transmission. This is not limited in at least one embodiment.

Figure 2C:
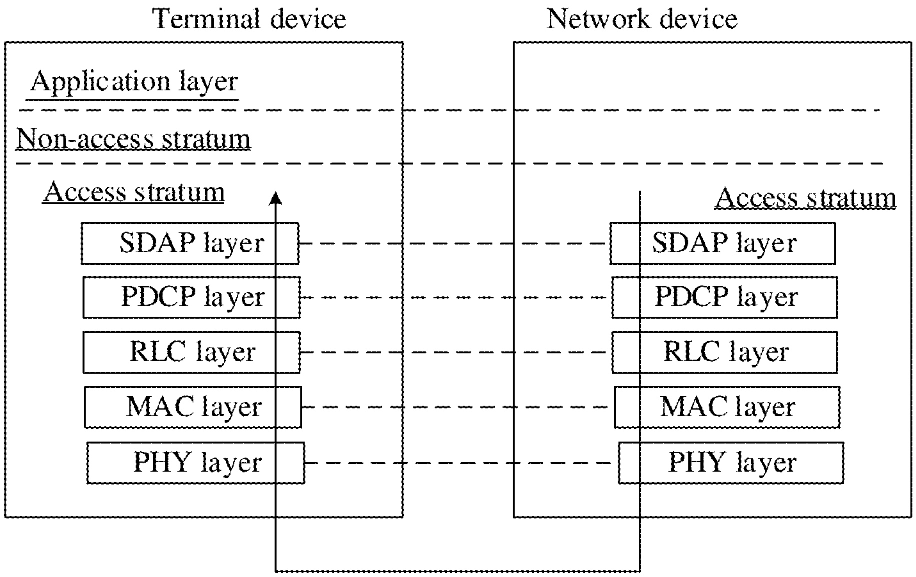
FIG. 2*c* is a schematic diagram of a protocol stack according to at least one embodiment.

As shown in FIG. 2*c*, a sidelink communication-based protocol stack of a terminal includes at least one of the following protocol layers (or entities): a sidelink service data adaptation (Service Data Adaptation Protocol, SDAP) layer, a sidelink packet data convergence protocol (PDCP) layer, a sidelink radio link control (RLC) layer, a sidelink media access control (MAC) layer, and a sidelink physical (PHY) layer.

The SL PDCP layer is mainly used to compress and decompress/encrypt and decrypt information. The SL RLC layer is mainly used to implement a function related to an automatic repeat request (ARQ), and segment and concatenate information or reassemble segmented and concatenated information. The SL MAC layer is mainly used to select a transmission format combination and implement functions related to scheduling and a hybrid automatic repeat request (HARQ). The SL PHY layer is mainly used to provide an information transmission service to the MAC layer and an upper layer, and perform coding and modulation or demodulation and decoding based on the selected transmission format combination. Therefore, in at least one embodiment, the protocol stack of the terminal is aggregated at any protocol layer in the PDCP layer, the RLC layer, or the MAC layer. For example, the protocol stack is aggregated at the PDCP layer, so that reliability of information transmission is improved through encryption and decryption. The foregoing adaptation layer is used to perform conversion on data between a base station and the protocol stack of the terminal. By setting the adaptation layer, conversion between the protocol stacks is ensured, so that configuration of the protocol stack in the base station is more flexible.

Generally, the configuration information in 301 includes a maximum quantity of times of the LBT failures and a timer length.

Specifically, configuration information based on a sidelink carrier means that one carrier corresponds to or has one configuration. Therefore, all resource pools in the carrier are used based on the same configuration to recover the consistent LBT failures. Alternatively, configuration information based on a sidelink resource pool means that one resource pool corresponds to or has one configuration, in response to the LBT failure occurring, a physical PHY entity of the first communication device indicates, to a media access control MAC entity of the first communication device, the LBT failure that occurs in the first resource pool. The MAC entity starts or restarts a timer corresponding to the first resource pool, and increases a count value of a counter corresponding to the first resource pool based on the LBT failures that occur in the first resource pool. in response to the count value of the counter reaching the maximum, the MAC entity determines that the consistent LBT failures occur in the first resource pool. Optionally, the physical layer of the first communication device performs LBT detection on each sidelink grant resource in the first resource pool.

For example, a granularity is a BWP (where in response to one carrier having one BWP, a BWP granularity is understood as a carrier granularity). in response to performing the LBT detection in the BWP and determining that each time an LBT failure occurs in the BWP, the first terminal performs the following operations:

1. The first terminal increases a count value of a counter (which is referred to as LBT_FAIL_COUNTER) of the BWP by 1, where an initial value of the counter is 0.
2. The first terminal starts or restarts a timer (which is referred to as IbtFailureDetectionTimer) of the BWP, where timing duration of the timer is duration configured by the first terminal or the base station.

Before the timer expires, in response to the count value of the counter reaching a threshold, the first terminal determines that consistent uplink LBT failures occur in the BWP, in response to the timer expiring, the terminal resets the count value of the counter to 0. The counter and the timer are a counter and a timer that correspond to the BWP or the carrier.

There is a similar design in a case in which the granularity is a resource pool. A difference lies in that the first terminal performs the operations on the counter and the timer on each resource pool, and determines whether the consistent LBT failures occur in the resource pool.

Regardless of whether the configuration information is associated with the carrier/BWP or the resource pool, the first terminal maintains the timer and the counter at a resource pool granularity to detect the consistent LBT failures. In other words, the first terminal separately maintains the timer and the counter for different resource pools. Alternatively, the configuration information is associated with the carrier, and the first terminal maintains the timer and the counter at a carrier granularity to detect the consistent LBT failures. In other words, the first terminal separately maintains the timer and the counter for different carriers.

In at least one embodiment, 303 is mainly for a case in which an RRC status of the first terminal is in a connected state. In other words, in response to the first terminal being in the connected state, the first terminal indicates, to the base station, the resource pool that the consistent LBT failures occur. in response to the first terminal being in an idle state or an inactive state, the first terminal skips performing the indication on the base station or skip performing 303. The first terminal in the connected state reports a MAC CE to the base station to enable the base station to sense, so that the base station updates the resource pool configuration or an LBT-related configuration of the resource pool. On the contrary, the first terminal in the idle or inactive state does not communicate with the base station. Therefore, this step is skipped.

In response to determining that the consistent LBT failures occur on the carrier or in the resource pool on a sidelink, the first terminal sends a media access control (MAC) control element (CE) indicating the LBT failures to the network device, to quickly indicate the LBT failures to the network device. Details are described below.

For example, the MAC CE shown in FIG. 3*b* includes a plurality of resource pool identifier fields, including eight resource pool identifier fields: $RP_0$ to $RP_7$. in response to a value of a bit to a resource pool identifier field being a first value, the consistent LBT failures occur on a terminal in a resource pool corresponding to the resource pool identifier field. in response to a value of a bit corresponding to a resource pool identifier field being a second value, no consistent LBT failure occurs on a terminal in a resource pool corresponding to the resource pool identifier field. Specific values of the first value and the second value are not limited. For example, the first value is 1, and the second value is 0.

In consideration of a scenario in which a plurality of sidelink carriers are supported, the first terminal further includes, in the MAC CE, information about a carrier to which the resource pool belongs. As shown in FIG. 3*c*, the MAC CE includes a carrier identifier field. For example, eight carriers are respectively represented as $C_0$ to $C_7$, and each $C_i$ field in the figure corresponds to one carrier. in response to the $C_i$ field corresponding to the first carrier being a first value, eight resource pool identifier fields corresponding to the first carrier are further identified in the MAC CE. in response to the $C_i$ field corresponding to the first carrier being a second value, the eight resource pool identifier fields corresponding to the first carrier are not identified in the MAC CE. In actual application, a carrier identifier field is alternatively indicated in another manner. This is not limited in at least one embodiment. The carrier identifier field indicates whether the consistent LBT failures occur on the terminal on the carrier. Similarly, in response to a value of a bit corresponding to the carrier identifier field being a first value, the consistent LBT failures occur on the terminal on the carrier. in response to a value of a bit corresponding to the carrier identifier field being a second value, no consistent LBT failure occurs on the terminal in the carrier. Specific values of the first value and the second value are not limited. For example, the first value is 1, and the second value is 0.

In response to the first terminal being in the connected mode and the consistent LBT failures occur in the resource pool, the first terminal generates a MAC CE to indicate, to the base station, information about the resource pool in which the consistent LBT failures occur. For example, the MAC CE includes indication information of the resource pool in which the consistent LBT failures occur, and the indication information is a resource pool index or a resource pool identifier.

Generally, the MAC CE corresponds to one logical channel identifier (LCH ID). For example, the LCH ID is used to identify the MAC CE, and the LCH ID is in a one-to-one correspondence with the MAC CE. Optionally, the base station configures a scheduling request (SR) resource for the MAC CE, to request an air interface (a Uu interface) resource from the base station for the MAC CE.

The first terminal stops performing resource selection in the resource pool in predetermined time; or in response to the consistent LBT failures occurring in all resource pools of the carrier, the first terminal reselects another carrier on the sidelink.

The following describes, in different modes, behavior of the first terminal or the base station after the consistent LBT failures occur.

1. The First Terminal is in Mode 1:

After the terminal reports the MAC CE to indicate, to the base station, the information about the resource pool in which the consistent LBT failures occur, the base station does not schedule a resource in the resource pool for the terminal within first predetermined time.

Further, after the predetermined time, the base station reschedules the resource in the resource pool for the terminal. in response to the LBT failure occurring again, the base station does not schedule the resource in the resource pool for the terminal within second predetermined time. The second predetermined time is not shorter than the first predetermined time.

Optionally, the foregoing mechanism is further applied to another resource pool whose time domain and/or frequency domain resources overlap with the resource pool. In other words, in response to time domain or frequency domain resources in different resource pools overlapping, and the consistent LBT failures occur in at least one of such resource pools, the base station does not schedule any resource in such resource pools within the predetermined time.

The foregoing behavior avoids unreliable communication caused by frequent attempts of the base station. In addition, same processing is performed on resource pools whose frequency domain locations overlap, so that reliability is improved.

2. The First Terminal is in Mode 2:

The first terminal in the connected state reports the MAC CE to the base station.

Regardless of whether the MAC CE is reported, the first terminal continues to attempt to select a resource in the resource pool in which the consistent LBT failures occur, and perform LBT to determine whether the resource is available. Alternatively, the first terminal performs an operation in at least one of the following manners, to avoid selecting some resources:

- Manner 1: A resource is no longer selected from the resource pool in which the consistent LBT failures occur.
- Manner 2: A resource is no longer selected from the resource pool within the predetermined time. Duration of the predetermined time is configured by the base station, or is determined by the terminal.
- Manner 3: Before the base station reconfigures the resource pool, a resource is no longer selected from the resource pool. Reconfiguration of the resource pool is LBT reconfiguration of the resource pool.

Therefore, in the foregoing manners, reliability of sidelink communication between the first communication device and another communication device (for example, the second communication device) is ensured.

In at least one embodiment, Manner 1 or Manner 2 is applicable to a terminal in a non-connected state, and Manner 3 is applicable to a terminal in a connected state.

Further, in consideration of a multi-carrier scenario, the MAC CE further carries information about a carrier corresponding to the resource pool.

Optionally, the first terminal alternatively sends indication information by using RRC to a base station that provides a service for the first terminal.

Further, in response to the consistent LBT failures occurring in all resource pools on a specific carrier, in response to there being another carrier, the first terminal performs carrier reselection, to select the another carrier for service transmission. in response to the consistent LBT failures occurring on all carriers (for example, the consistent LBT failures occur in all resource pools on all carriers), the first terminal sends indication information to an upper layer (for example, a PC5-S layer, a V2X layer, or an application layer) of the first terminal, to indicate that a PC5 interface is unavailable. Correspondingly, the application layer performs service transmission by using an air interface (a Uu interface).

In this embodiment, the terminal is enabled to perform LBT failure processing based on the resource pool, and the base station is indicated or the behavior of the terminal is limited to ensure the sidelink communication reliability.

For the second manner, that is, a case in which the first terminal obtains the configuration information based on a preconfiguration, the following describes in detail interaction between terminals. As shown in FIG. 3, for example, a serving base station of a UE 1 is a BS 1, and a unicast connection is used for communication between a UE 2 and the UE 1. The UE 2 is in an idle state, an inactive state, or a connected state. in response to the UE 2 being in the connected state, a serving base station corresponding to the UE 2 is a BS 2. In this embodiment, the BS 2 and the BS 1 is a same base station.

After the UE 1 determines that the consistent LBT failures occur in the first resource pool, this embodiment further includes the following steps:

- 305: The UE 1 indicates, to the UE 2, the first resource pool or the first carrier in or on which the consistent LBT failures occur.
- 307: The UE 2 indicates, to the BS 2, the first resource pool or the first carrier in or on which the consistent LBT failures occur.

The foregoing signaling interaction between the terminals in the unicast connection improves reliability and validity of communication between the terminals.

For the unicast connection communication scenario, the UE 1 skips 303. In other words, the UE 1 does not indicate, to the BS 1, the resource pool in which the consistent LBT failures occur. For example, after performing 301, the UE 1 skips 303, and directly performs 305. Alternatively, the UE 1 and the UE 2 in 305 or 307 is interchanged. For example, the UE 1 receives the resource pool or the carrier that is indicated by the UE 2 and in or on which the consistent LBT failures occur, and then transmit the indication information to the BS 1. In this manner, for a same UE 1, the UE 1 not only detects the resource pool or the carrier in or on which the consistent LBT failures occur, but also obtain, from the peer UE 2, another resource pool or carrier in or on which the consistent LBT failures occur, to ensure reliability of sidelink communication between the UE 1 and the UE 2.

In response to the UE 1 transmitting a service to the UE 2 by using the resource pool in which the consistent LBT failures occur, the UE 2 fails to receive the service or suffer a reception failure. Therefore, the UE 1 indicates a configuration of the resource pool to the UE 2, and the UE 2 determines, based on resource pool information indicated by the UE 1, the resource pool in which the consistent LBT failures occur, and then map the resource pool to a resource pool obtained by the UE 2 from the base station or from a preconfiguration. For example, the mapping means that the UE 2 obtains indication information (a resource pool identifier or a resource pool index) of the resource pool from the UE 1, and the UE 2 determines a time-frequency domain resource of the resource pool based on the indication information. The time-frequency domain resource is configured by the base station for the UE 2 or is obtained by the UE 2 based on the preconfiguration.

Optionally, each base station in a sidelink communication system provides a same resource pool configuration for a UE served by the base station, to ensure resource configuration consistency. For example, a resource pool configuration provided by the serving base station BS 1 of the UE 1 for the UE 1 is the same as a resource pool configuration provided by the serving base station BS 2 of the UE 2 for the UE 2. In this case, in response to the UE 1 indicating, to the UE 2, the resource pool in which the consistent LBT failures occur, the UE 2 correctly understands. Alternatively, a same base station provides services for the UE 1 and the UE 2. In this scenario, the base station provides a same resource pool configuration for different UEs.

After receiving the indication information sent by the UE 1 and indicating the resource pool or the carrier in or on which the consistent LBT failures occur, the UE 2 in the connected state further sends the indication information to the serving base station BS 2 of the UE 2, so that in response to subsequently scheduling a resource for the UE 2, the BS 2 avoids the resource pool or carrier in or on which the consistent LBT failures occur.

Specifically, the UE 2 sends the indication information to the BS 2 by using a MAC CE. The MAC CE is the same as or different from a MAC CE used by the UE 2 in response to the UE 2 detecting the resource pool in which the consistent LBT failures occur. In response to the MAC CEs being the same, the MAC CE further includes indication information that indicates whether the consistent LBT failures are detected by the UE 2 or detected by the peer UE. Optionally, the MAC CE further includes or indicates the unicast connection between the UE 1 and the UE 2. Therefore, the base station is enabled to perform corresponding processing for different scenarios.

Further, in consideration of a multi-carrier scenario, the MAC CE further carries information about a carrier corresponding to the resource pool.

Optionally, the UE 2 alternatively sends the indication information to the BS 2 by using RRC.

Generally, the UE 2 in the idle state or the inactive state skips 307 or does not perform 307. For an operation solution in which the UE 2 determines to avoid some resources, refer to the foregoing related descriptions of the first terminal. For example, after receiving the indication information of the UE 1, in response to selecting a sidelink resource for the unicast connection, the UE 2 does not select or avoids a resource in the resource pool in which the consistent LBT failures occur, or does not select a resource in the resource pool within a period of time.

In at least one embodiment, in response to the UE 1 being reconfigured by the BS 1, or the UE 1 starts to use the resource in the resource pool again for communication, in response to the consistent LBT failures not being identified, or the consistent LBT failures are not identified within a period of time, the UE 1 sends indication information to the UE 2, where the indication information indicates that the resource pool is available. In at least one embodiment, in response to the UE 2 receiving service transmission or data from the UE 1 in the resource pool, in response to selecting the sidelink resource for the unicast connection, the UE 2 reselects the resource in the resource pool.

The foregoing uses the resource pool in which the consistent LBT failures occur as an example to describe interaction between the UEs and behavior of the UE 2 after the UE 2 receives an indication of the UE 1. Optionally, in the foregoing process, sidelink carrier information is exchanged, but sidelink resource pool information is not exchanged. For example, the UE 1 indicates, to UE 2, information about a carrier on which the consistent LBT failures occur, and the UE 2 indicates, to the serving base station BS 2, the information about the carrier on which the consistent LBT failures occur. Optionally, interaction between the terminals includes corresponding sidelink unicast connection information. In a scenario in which resource pool configurations are inconsistent, the interaction is performed at a carrier granularity, to ensure communication reliability, and further reduce signaling overheads.

In response to only the information about the carrier on which the consistent LBT failures occur being provided, for a condition for the terminal or the base station to determine that the consistent LBT failures occur on the carrier, refer to the foregoing descriptions. For example, the consistent LBT failures occur on all resource pools on the carrier on the sidelink, and are not recovered. However, at least one embodiment is not limited thereto.

The following describes two implementations of behavior of the UE 2 after the UE 2 obtains the indication information of the UE 1. For example, the UE 2 performs resource pool selection or reselection to ensure communication reliability.

Manner 1:

The UE 2 selects a resource in another resource pool or a resource on another carrier on the sidelink, and performs unicast connection communication with the UE 1 based on the resource. The another resource pool is different from the resource pool in which the consistent LBT failures occur, or the another carrier is different from the carrier on which the consistent LBT failures occur.

Manner 2:

The UE 2 obtains a sidelink grant resource. The grant resource is located in the resource pool or the carrier in or on which the consistent LBT failures occur. In this case, the UE 2 does not use the sidelink grant resource to perform unicast connection communication with the UE 1.

For example, the UE 2 selects a resource in another resource pool or a resource on another carrier on the sidelink, and performs the unicast connection communication with the UE 2 based on the resource. The another resource pool is different from the resource pool or the carrier in or on which the consistent LBT failures occur. Alternatively, the UE 2 obtains a sidelink grant resource. The grant resource is located in the resource pool or the carrier in or on which the consistent LBT failures occur. The UE 2 does not use the sidelink grant resource to perform unicast connection communication with the UE 1.

Specifically, in response to determining that a current scheduled resource is a resource in the resource pool or the carrier in or on which the consistent LBT failures occur and that is indicated by the UE 1, in response to selecting to-be-transmitted data for the resource, the UE 2 excludes the unicast connection to the UE 1. For example, a physical layer of the UE 2 indicates, to a MAC entity of the UE 2, that the current scheduled resource belongs to the resource pool or the carrier in or on which the consistent LBT failures occur. In at least one embodiment, the MAC entity of the UE 2 performs a logical channel prioritization (LCP) process.

For example, in response to the MAC layer of the UE 2 performing the LCP process, the unicast connection between the UE 2 and the UE 1 is excluded. in response to the physical layer indicating, to the MAC entity, that the current scheduled resource belongs to another resource pool or carrier, and the another resource pool or carrier is used for the unicast connection communication, based on a priority, a determination is made whether to use the resource to send data on the unicast connection.

The UE 2 selects a resource of another resource pool or carrier in or on which no consistent LBT failure occurs, and the MAC layer of the UE 2 converts the data on the unicast connection corresponding to the resource pool or carrier into a MAC packet data unit (PDU), and sends information through a PC5 interface by using the corresponding resource.

In conclusion, after the UE 2 receives, from the UE 1, information about the resource pool or the carrier in or on which the consistent LBT failures occur, the LCP process or resource selection/reselection is affected. The foregoing information is applicable to the unicast connection between the UE 1 and the UE 2. Therefore, in a communication process, the BS 2 schedules a resource of the resource pool or the carrier for the UE 2, or the UE 2 selects the resource pool or the carrier based on Mode 2. In other words, the UE 2 obtains the resource of the resource pool or the carrier due to another unicast/broadcast/multicast communication usage. In this case, in response to performing the LCP process, the UE 2 excludes a unicast connection corresponding to the resource pool or the carrier.

In the foregoing solution, the UE 1 indicates, to the peer UE 2 in the unicast connection with the UE 1, the information about the resource pool or the carrier that is detected by the UE 1 and in or on which the consistent LBT failures occur, to assist the UE 2 in resource selection. In this way, the UE 2 avoids using the resource of the resource pool or the carrier to perform sidelink communication with the UE 1.

The following describes a scenario in which a single LBT failure occurs. In this manner, sidelink communication reliability is improved. For the single LBT failure, the following method is performed before the consistent LBT failures described above and before failure information is exchanged between the terminals or between the terminal and the base station (for example, 303 to 307), or is independent of the foregoing exchange. For example, the first terminal determines, based on the obtained sidelink grant resource, whether to perform LBT detection. in response to the first terminal determining not to perform the LBT detection, the detection is not performed on subsequent consistent LBT operations. in response to the first terminal determining to perform the LBT detection, the first terminal further determines, based on a case whether there is to-be-transmitted data in a process, to feed back an ACK or a NACK to the base station. Alternatively, the first terminal further performs the LBT detection for a plurality of times, and exchange a detection conclusion, for example, occurrence of the consistent LBT failures, with the peer terminal or the base station. For a method related to the LBT detection performed for the plurality of times, refer to the foregoing descriptions. Details are not described again.

At least one embodiment further includes:

The first terminal receives a sidelink grant resource from the base station.

In response to there being no to-be-transmitted data in a process corresponding to the sidelink grant resource, the first terminal skips or suspends the LBT detection on the sidelink grant resource.

At least one embodiment further includes:

The first terminal receives a sidelink grant resource from the base station.

The first terminal performs the LBT detection on the sidelink grant resource.

In response to there being to-be-transmitted data in a process corresponding to the sidelink grant resource and an LBT failure occur, the first terminal feeds back a negative acknowledgment NACK to the base station.

In response to there being no to-be-transmitted data in the process corresponding to the sidelink grant resource and the LBT failure occur, the first terminal feeds back an acknowledgment ACK to the base station.

Generally, the first terminal sends terminal assistance information (UEAssistanceInformation) to the base station to request the base station to perform sidelink configured grant (sidelink CG). For example, the assistance information carries one or more of a service periodicity, a message size, a time offset, or a QoS flow identifier, and is used by the base station to determine, based on a QoS parameter corresponding to a previously received QoS flow, to configure the sidelink CG for the first terminal. For example, the time offset indicates a time offset between a time point at which a first piece of discovery information arrives and a reference time point. For example, the reference time point is a subframe 0 of a system frame number (SFN) 0.

The base station configures the sidelink CG for the first terminal based on a request of the first terminal. Optionally, the sidelink CG configuration carries indication information of a resource pool, and the indication information indicates that the sidelink CG is a resource in the resource pool.

For example, after receiving a sidelink grant scheduled by the base station, the first terminal performs LBT detection on the grant, and in response to the first terminal determining that the LBT failures occur, the first terminal uses the grant to feed back the NACK to the base station.

Generally, after receiving the sidelink grant indicated by the base station by using the DCI, the first terminal indicates the grant to a MAC layer. Then, the MAC layer obtains a transmission block (TB) based on the grant, sends the TB to a PHY layer, and waits for the PHY layer to send the TB. Based on an unlicensed spectrum, the PHY layer performs the LBT detection before the grant arrives.

In a sidelink communication scenario, the resource or the grant received by the first terminal does not have a corresponding service or data that is to be transmitted. In this case, the MAC layer of the first terminal indicates the PHY layer to skip performing the LBT detection, or suspends the LBT detection that is being performed, to save power. Optionally, in response to the first terminal not skipping the LBT detection, and the single LBT failure occurs, the first terminal feeds back the NACK to the base station, in response to no service data being transmitted in the grant, the first terminal feeds back the ACK to the base station, to avoid that the base station continues to schedule a retransmission resource.

Figure 4:
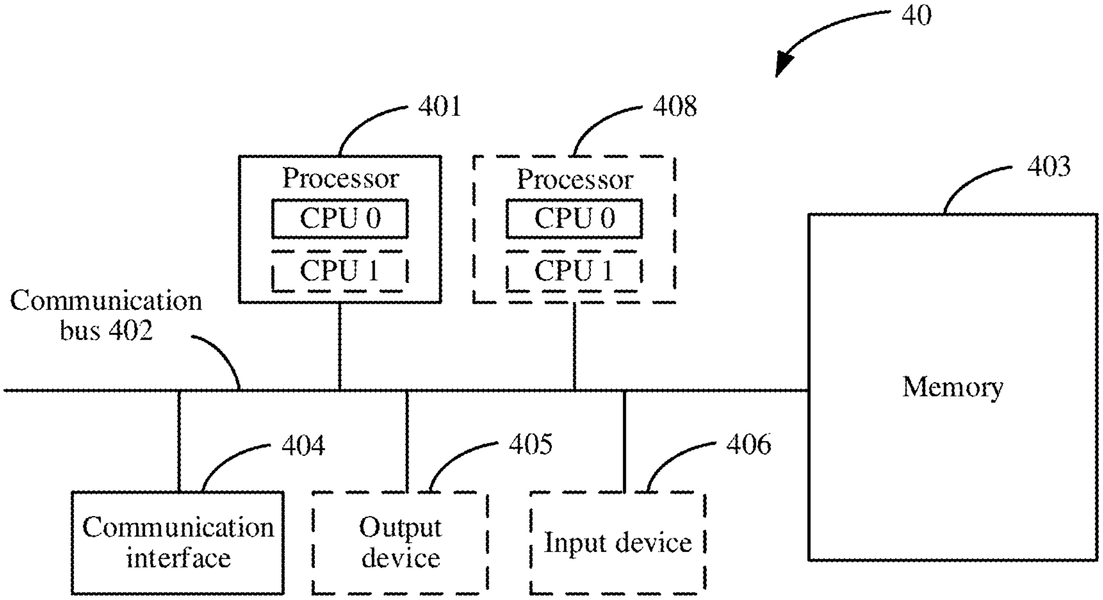
FIG. 4 is a schematic diagram of a structure of a communication apparatus according to at least one embodiment.

FIG. 4 is a schematic structural diagram of hardware of a communication apparatus 40 according at least one embodiment. The communication apparatus 40 includes at least one processor 401, a communication bus 402, a memory 403, and at least one communication interface 404.

The processor 401 is a general-purpose central processing unit (CPU), a microprocessor, an application-specific integrated circuit (ASIC), or one or more integrated circuits configured to control program execution of the solutions in at least one embodiment.

The communication bus 402 includes a path on which information is transmitted between the foregoing components.

The communication interface 404 uses any transceiver-type apparatus, and is configured to communicate with another device or a communication network like Ethernet, a radio access network (RAN), or a wireless local area network (WLAN).

The memory 403 is a read-only memory (ROM) or another type of static storage device that stores static information and instructions, or a random access memory (RAM) or another type of dynamic storage device that stores information and instructions. Alternatively, the memory 403 is an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that is used to carry or store expected program code in a form of an instruction or a data structure and that is accessed by a computer. However, the memory 403 is not limited thereto. The memory exists independently, and is connected to the processor through the bus. The memory is alternatively integrated with the processor.

The memory 403 is configured to store and execute application program code in solutions of at least one embodiment, and the processor 401 controls execution. The processor 401 is configured to execute the application program code stored in the memory 403, to implement the communication method according to at least one embodiment.

Alternatively, optionally, in at least one embodiment, the processor 401 performs processing-related functions in the communication method provided in at least one embodiment. The communication interface 404 is responsible for communicating with another device or network. This is not specifically limited in at least one embodiment.

During specific implementation, in an embodiment, the processor 401 includes one or more CPUs such as a CPU 0 and a CPU 1 in FIG. 4.

During specific implementation, in an embodiment, the communication apparatus 40 includes a plurality of processors, for example, the processor 401 and a processor 408 in FIG. 4. Each of the processors is a single-core (single-CPU) processor, or is a multi-core (multi-CPU) processor. The processor herein is one or more devices, circuits, and/or processing cores configured to process data (for example, computer program instructions). FIG. 4 shows only a simplified design of the communication apparatus 40. During actual application, the communication apparatus includes any quantity of input devices, output devices, processors, memories, and communication interfaces, and the foregoing functions is provided by any quantity of communication units separately or in a manner of a combination.

During specific implementation, in an embodiment, the communication apparatus 40 further includes an output device 405 and an input device 406. The output device 405 communicates with the processor 401, and displays information in a plurality of manners. For example, the output device 405 is a liquid crystal display (LCD), a light emitting diode (LED) display device, a cathode ray tube (CRT) display device, a projector, or the like. The input device 406 communicates with the processor 401 and receives a user input in a plurality of manners. For example, the input device 406 is a mouse, a keyboard, a touchscreen device, or a sensor device.

In addition, as described above, the communication apparatus 40 provided in at least one embodiment is a chip, a terminal, a base station, a communication device, a network device, a CU, or a DU, or a device with a structure similar to that in FIG. 4. A type of the communication apparatus 40 is not limited in at least one embodiment.

Figure 5:
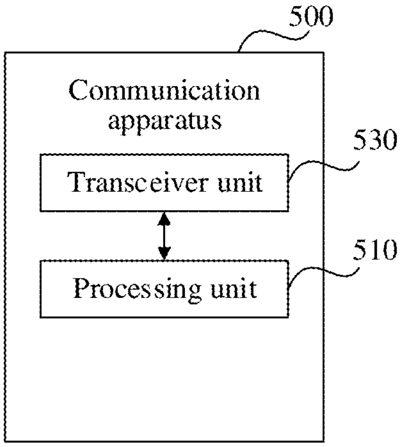
FIG. 5 is a schematic diagram of a structure of a communication apparatus according to at least one embodiment.

FIG. 5 is a schematic diagram of a structure of a communication apparatus 500 in a communication method according at least one embodiment. The communication apparatus is a terminal, a base station, a communication device, a network device, an apparatus having a function of a terminal or a base station, a chip, or the like in embodiments. Meanings or functions of the following terms or nouns is understood with reference to the foregoing descriptions, and details or implementations of the following steps or actions is also understood with reference to the foregoing descriptions. As shown in FIG. 5, the communication apparatus 500 includes a processing unit 510 and a transceiver unit 530. Alternatively, the transceiver unit in the communication device includes a receiving module and a sending module, and the receiving module and the sending module are connected based on an antenna.

The transceiver unit 530 is configured to support information receiving and sending between the communication device and the network device. Alternatively, the transceiver unit 530 is configured to perform processing performed by the communication device or the network device in the communication methods described in the foregoing embodiments.

In at least one embodiment, the communication apparatus is a terminal device or a chip configured in the terminal device. The following uses a first communication device or a second communication device as an execution body for description.

In at least one embodiment, the first communication device receives configuration information from a network device by using the transceiver unit 530. The configuration information is used by the first communication device to detect an LBT failure that occurs in a first resource pool, the configuration information is associated with a first carrier or the first resource pool, and the first resource pool belongs to the first carrier. In addition, the first communication device sends first indication information to the network device by using the transceiver unit 530. The first indication information indicates the first resource pool in which the consistent LBT failures occur.

Based on the communication manner, flexible configuration of sidelink communication between terminals is implemented, and system adaptation reliability is improved.

Optionally, the configuration information includes a maximum quantity of times of the LBT failures and a timer length. A PHY entity of the first communication device indicates, to a MAC entity of the first communication device, the LBT failures that occur in the first resource pool. The MAC entity starts a timer corresponding to the first resource pool, and increases a count value of a counter corresponding to the first resource pool based on the LBT failures that occur in the first resource pool. in response to the count value of the counter reaching the maximum, the MAC entity determines that the consistent LBT failures occur.

The foregoing LBT detection ensures that the first communication device learns of a LBT failure status in real time, to perform recovery in a timely manner, and ensure validity of the sidelink communication.

Optionally, the first communication device stops resource selection in the first resource pool within predetermined time. Alternatively, in response to the consistent LBT failures occurring in all resource pools of the first carrier, the first communication device reselects a second carrier of a sidelink.

Optionally, the first communication device receives second indication information from a second communication device by using the transceiver unit 530. The second indication information indicates a second resource pool or a second carrier that is on the sidelink and in or on which the consistent LBT failures.

Based on the second indication information, the first communication device determines whether to perform sidelink communication with the second communication device based on the second resource pool or the second carrier, for example, does not use the foregoing resource within predetermined time, or changes to use another resource, to ensure real-time communication.

Optionally, the first communication device sends third indication information to the network device by using the transceiver unit 530. The third indication indicates the second resource pool or the second carrier.

Optionally, the third indication information further indicates a unicast connection between the first communication device and the second communication device.

Based on the third information, the network device does not schedule the foregoing resource to the first communication device, or schedule a resource to the first communication device based on another resource pool or carrier, to ensure real-time valid communication between the first communication device and the second communication device, and improve scheduling reliability.

Optionally, the first communication device selects a resource in a third resource pool or a resource on a third carrier on the sidelink by using the processing unit 510, and performs unicast connection communication with the second communication device based on the resource.

The third resource pool is different from the second resource pool, or the third carrier is different from the second carrier.

Optionally, the first communication device obtains a sidelink grant resource by using the processing unit 510 or the transceiver unit 530. The grant resource is located in the second resource pool or on the second carrier.

The first communication device does not use the grant resource to perform the unicast connection communication with the second communication device.

Optionally, the first communication device sends fourth indication information to the second communication device by using the transceiver unit 530. The fourth indication information indicates the first resource pool or the first carrier in or on which the consistent LBT failures occur.

Optionally, in response to the sidelink including a plurality of carriers, the first indication information further indicates a carrier to which the first resource pool belongs.

Optionally, the first communication device receives a sidelink grant resource from the network device by using the transceiver unit 530. in response to there being no to-be-transmitted data in a process corresponding to the grant resource, the first communication device skips or suspends LBT detection on the grant resource.

Optionally, the first communication device receives a sidelink grant resource from the network device by using the transceiver unit 530, and the first communication device performs LBT detection on the grant resource. in response to there being to-be-transmitted data in a process corresponding to the grant resource, the first communication device feeds back a NACK to the network device by using the transceiver unit 530. Alternatively, in response to there being no to-be-transmitted data in a process corresponding to the grant resource, the first communication device feeds back an ACK to the network device by using the transceiver unit 530.

Based on the foregoing behavior of the communication device, a case in which the network device performs invalid or useless resource scheduling is avoided. This achieves resource scheduling validity.

In at least one embodiment, the first communication device receives first indication information from the second communication device by using the transceiver unit 530. The first indication information indicates a first resource pool or a first carrier that is on a sidelink and in or on which consistent listen before talk LBT failures occur. In addition, the first communication device sends second indication information to a network device by using the transceiver unit 530. The second indication information indicates the first resource pool or the first carrier.

Optionally, the second indication information further indicates a unicast connection between the first communication device and the second communication device.

Optionally, the first communication device selects a resource in a second resource pool or a resource on a second carrier on the sidelink by using the processing unit 510, and performs unicast connection communication with the second communication device based on the resource.

The second resource pool is different from the second resource pool, or the second carrier is different from the second carrier.

Optionally, the first communication device obtains a sidelink grant resource by using the transceiver unit 530 or the processing unit 510. The grant resource is located in the first resource pool or on the first carrier. The first communication device does not use the grant resource to perform the unicast connection communication with the second communication device.

Optionally, in response to the sidelink including a plurality of carriers, the first indication information further indicates a carrier to which the first resource pool belongs.

Optionally, the first communication device receives a sidelink grant resource from the network device by using the transceiver unit 530. in response to there being no to-be-transmitted data in a process corresponding to the grant resource, the first communication device skips or suspends LBT detection on the grant resource.

Optionally, the first communication device receives a sidelink grant resource from the network device by using the transceiver unit 530. The first communication device performs LBT detection on the grant resource. in response to there being to-be-transmitted data in a process corresponding to the grant resource, the first communication device feeds back a NACK to the network device by using the transceiver unit 530. Alternatively, in response to there being no to-be-transmitted data in a process corresponding to the grant resource, the first communication device feeds back an ACK to the network device by using the transceiver unit 530.

In at least one embodiment, the communication apparatus is a network device or a chip configured in a network device. The following uses the network device as an execution body for description.

In at least one embodiment, the network device sending configuration information to the first communication device by using the transceiver unit 530. The configuration information is associated with a first carrier or a first resource pool, and the first resource pool belongs to the first carrier. In addition, the network device receives first indication information from the first communication device. The first indication information indicates the first resource pool in which consistent LBT failures occur.

Optionally, the configuration information includes a maximum quantity of times of the LBT detection and a timer length.

Optionally, the first indication information further indicates a unicast connection between the first communication device and the second communication device.

Optionally, in response to a sidelink including a plurality of carriers, the first indication information further indicates a carrier to which the first resource pool belongs.

In this embodiment, the communication device or the network device is presented in a form of function modules or units obtained through division in an integrated manner. The "module" or "unit" herein is an application-specific integrated circuit (ASIC), a circuit, a processor and a memory that execute one or more software programs or firmware programs, an integrated logic circuit, and/or another component that provides the foregoing function. In a simple embodiment, a person skilled in the art is able to figure out that the apparatus 500 is in a form shown in FIG. 4. For example, the function/implementation process of the transceiver unit 530 in FIG. 5 is implemented by the processor 401 and the memory 403 in FIG. 4. Specifically, the application program code stored in the memory 403 is invoked by the processor 401. This is not limited in at least one embodiment. Alternatively, optionally, the function/implementation process of the transceiver unit 530 in FIG. 5 is implemented by the processor 401 in FIG. 4, or is implemented by the communication interface 404 in FIG. 4. This is not limited in at least one embodiment. Specifically, the application program code stored in the memory 403 is invoked by the processor 401. This is not limited in at least one embodiment.

Optionally, at least one embodiment provides a chip system. The chip system includes a processor, configured to support a communication device implementing the foregoing communication method. In at least one embodiment, the chip system further includes a memory. The memory is configured to store program instructions and data that are used for the communication device. The chip system includes a chip, or includes a chip and another discrete device. This is not specifically limited in at least one embodiment.

The controller/processor configured to perform the base station, terminal, base station or terminal in at least one embodiment are a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor implements or executes various example logical blocks, modules, and circuits described with reference to content disclosed herein. The processor is a combination of processors implementing a computing function, for example, a combination of one or more microprocessors, or a combination of the DSP and a microprocessor.

Methods or algorithm steps described in combination with the content disclosed in at least one embodiment is implemented by hardware, or is implemented by a processor by executing software instructions. The software instructions include a corresponding software module. The software module is stored in a RAM memory, a flash memory, a ROM memory, an EPROM memory, an EEPROM memory, a register, a hard disk, a removable hard disk, a CD-ROM memory, or a storage medium in any other form well-known in the art. For example, a storage medium is coupled to a processor, so that the processor reads information from the storage medium and writes information into the storage medium. Certainly, the storage medium is a component of the processor. The processor and the storage medium are disposed in an ASIC. In addition, the ASIC is located in a terminal or a base station. Certainly, the processor and the storage medium exist in a terminal or a base station as discrete components.

A person skilled in the art should be aware that in the foregoing one or more examples, functions described in at least one embodiment are implemented by hardware, software, firmware, or any combination thereof. in response to the functions being implemented by software, the foregoing functions is stored in a computer-readable medium or transmitted as one or more instructions or code in a computer-readable medium. The computer-readable medium includes a computer storage medium and a communication medium, and the communication medium includes any medium that enables a computer program to be transmitted from one place to another. The storage medium is any available medium accessible to a general-purpose or a dedicated computer.

In at least one embodiment, the communication method is described from the perspective of each network element and the interaction between the network elements. Each network element, like the terminal or the communication apparatus, includes hardware structures and/or software modules for executing corresponding functions, to implement the foregoing functions. A person of ordinary skill in the art should easily be aware that, in combination with the examples described in embodiments disclosed herein, units, algorithms and steps, are implemented by hardware or a combination of hardware and computer software. Whether a function is performed by hardware or hardware driven by computer software depends on particular applications and design constraints of the technical solutions. A person skilled in the art uses different methods to implement the described functions for at least one embodiment, but the implementation is not considered to go beyond the scope of embodiments described herein.

Objectives, technical solutions, and beneficial effects of at least one embodiment are further described in detail in the foregoing specific implementations. The foregoing descriptions are understood to be merely specific implementations of at least one embodiment, and are not intended to limit the protection scope of embodiments described herein. Any modification, equivalent replacement, improvement, or the like made based on the technical solutions of embodiments described herein shall fall within the protection scope of the claims.

What is claimed is:

1. A sidelink communication method, comprising:

receiving, by a first communication device, configuration information from a network device, wherein the configuration information is usable by the first communication device to detect consistent listen before talk (LBT) failures that occur in a first resource pool of resources usable for sidelink communication, the configuration information is associated with a first carrier usable for the sidelink communication or the first resource pool, and the first resource pool belongs to the first carrier;

sending, by the first communication device, first indication information to the network device, wherein the first indication information indicates the first resource pool in which the consistent LBT failures occur;

sending, by the first communication device, second indication information to a second communication device, wherein the second indication information indicates the first resource pool in which the consistent LBT failures occur; and receiving, by the first communication device, third information from the second communication device, the third information indicates a resource of another resource pool or carrier in or on which no consistent LBT failure occurs.

2. The method according to claim 1, wherein the receiving, by the first communication device, the configuration information includes receiving the configuration information that includes a maximum quantity of times of the consistent LBT failures and a timer length;

the method further comprising indicating by a physical (PHY) entity of the first communication device to a media access control (MAC) entity of the first communication device that the LBT failure occurs in the first resource pool;

starting, by the MAC entity, a timer corresponding to the first resource pool, and increasing a count value of a counter corresponding to the first resource pool based on the LBT failures that occur in the first resource pool; and in response to the count value of the counter reaching a maximum, determining by the MAC entity that the consistent LBT failures occur in the first resource pool.

3. The method according to claim 1, further comprising:

stopping, by the first communication device, resource selection in the first resource pool within predetermined time; or reselecting, by the first communication device, a second carrier of a sidelink when the consistent LBT failures occur in all resource pools of the first carrier.

4. The method according to claim 1, further comprising:

receiving, by the first communication device, third indication information from the second communication device, wherein the third indication information indicates a second resource pool or a second carrier that is on a sidelink and in or on which the consistent LBT failures occur.

5. The method according to claim 1, further comprising:

sending, by the first communication device, fourth indication information to the second communication device, wherein the fourth indication information indicates the first resource pool or the first carrier in or on which the consistent LBT failures occur.

6. The method according to claim 1, wherein in response to a sidelink including a plurality of carriers, the sending, by the first communication device, the first indication information to the network device includes sending the first indication information usable to indicate the first carrier to which the first resource pool belongs.

7. A sidelink communication method, comprising:

sending, by a network device, configuration information to a first communication device, wherein the configuration information is usable by the first communication device to detect consistent listen before talk (LBT) failures that occur in a first resource pool of resources usable for sidelink communication, the configuration information is associated with a first carrier usable for the sidelink communication or the first resource pool, and the first resource pool belongs to the first carrier;

receiving, by the network device, first indication information from the first communication device, wherein the first indication information indicates the first resource pool detected by the first communication device in which the consistent LBT failures occur; and receiving, by the network device, second indication information from a second communication device, wherein the second indication information indicates a second resource pool detected by the second communication device in which the consistent LBT failures occur.

8. The method according to claim 7, wherein the sending, by the network device, the configuration information to the first communication device includes sending the configuration information that includes a maximum quantity of times of the LBT failures and a timer length.

9. The method according to claim 7, wherein the receiving, by the network device, the first indication information from the first communication device includes receiving the first indication information that is usable to indicate a unicast connection between the first communication device and the second communication device.

10. The method according to claim 7, wherein in response to a sidelink including a plurality of carriers, the receiving, by the network device, the first indication information from the first communication device includes receiving the first indication information that is usable to indicate the first carrier to which the first resource pool belongs.

11. A sidelink communication apparatus, comprising:

at least one processor, wherein the at least one processor is configured to execute instructions to cause the processor to perform operations to:

receive configuration information from a network device, wherein the configuration information is usable to detect consistent listen before talk (LBT) failures that occur in a first resource pool of resources usable for sidelink communication, the configuration information is associated with a first carrier usable for the sidelink communication or the first resource pool, and the first resource pool belongs to the first carrier;

send first indication information to the network device, wherein the first indication information indicates the first resource pool in which the consistent LBT failures occur;

send second indication information to a second communication device, wherein the second indication information indicates the first resource pool in which the consistent LBT failures occur; and receive third information from the second communication device, the third information indicates a resource of another resource pool or carrier in or on which no consistent LBT failure occurs.

12. The apparatus according to claim 11, wherein the configuration information includes a maximum quantity of times of the consistent LBT failures and a timer length;

a physical (PHY) entity indicates, to a media access control (MAC) entity, the LBT failure that occurs in the first resource pool;

the MAC entity starts a timer corresponding to the first resource pool, and increases a count value of a counter corresponding to the first resource pool based on the LBT failures that occur in the first resource pool; and when the count value of the counter reaches the maximum, the MAC entity determines that the consistent LBT failures occur in the first resource pool.

13. The apparatus according to claim 11, wherein the at least one processor is further configured to:

stop resource selection in the first resource pool within predetermined time; or reselect a second carrier of a sidelink when the consistent LBT failures occur in all resource pools of the first carrier.

14. The apparatus according to claim 11, wherein the at least one processor is further configured to:

receive third indication information from the second communication device, wherein the third indication information indicates a second resource pool or a second carrier that is on a sidelink and in or on which the consistent LBT failures occur.

15. The apparatus according to claim 11, wherein the at least one processor is further configured to:

send fourth indication information to the second communication device, wherein the fourth indication information indicates the first resource pool or the first carrier in or on which the consistent LBT failures occur.

16. The apparatus according to claim 11, wherein in response to a sidelink including a plurality of carriers, the first indication information is further usable to indicate the first carrier to which the first resource pool belongs.

17. A sidelink communication apparatus, comprising:

at least one processor, wherein the at least one processor is configured to execute instructions to cause the processor to perform operations to:

send configuration information to a first communication device, wherein the configuration information is usable by the first communication device to detect consistent listen before talk (LBT) failures that occur in a first resource pool of resources usable for sidelink communication, the configuration information is associated with a first carrier usable for the sidelink communication or the first resource pool, and the first resource pool belongs to the first carrier;

receive first indication information from the first communication device, wherein the first indication information indicates the first resource pool detected by the first communication device in which the consistent LBT failures occur; and receive second indication information from a second communication device, wherein the second indication information indicates a second resource pool detected by the second communication device in which the consistent LBT failures occur.

18. The apparatus according to claim 17, wherein the configuration information includes a maximum quantity of times of the LBT failures and a timer length.

19. The apparatus according to claim 17, wherein the first indication information further indicates a unicast connection between the first communication device and the second communication device.

20. The apparatus according to claim 17, wherein in response to a sidelink including a plurality of carriers, the first indication information is further usable to indicate the first carrier to which the first resource pool belongs.

* * * * *